(12) United States Patent
Liu et al.

(10) Patent No.: US 10,972,923 B2
(45) Date of Patent: Apr. 6, 2021

(54) INFORMATION PROCESSING METHOD AND DEVICE

(71) Applicant: CHINA ACADEMY OF TELECOMMUNICATIONS TECHNOLOGY, Beijing (CN)

(72) Inventors: Jiamin Liu, Beijing (CN); Pierre Bertrand, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 60 days.

(21) Appl. No.: 16/347,102

(22) PCT Filed: Nov. 2, 2017

(86) PCT No.: PCT/CN2017/109084
§ 371 (c)(1),
(2) Date: May 2, 2019

(87) PCT Pub. No.: WO2018/082603
PCT Pub. Date: May 11, 2018

(65) Prior Publication Data
US 2019/0274058 A1    Sep. 5, 2019

(30) Foreign Application Priority Data

Nov. 4, 2016 (CN) .......................... 201610962991.0

(51) Int. Cl.
*H04W 24/04* (2009.01)
*H04W 24/08* (2009.01)
(Continued)

(52) U.S. Cl.
CPC .............. *H04W 24/04* (2013.01); *H04L 1/18* (2013.01); *H04W 24/08* (2013.01); *H04W 28/04* (2013.01);
(Continued)

(58) Field of Classification Search
CPC ..... H04W 24/04; H04W 76/15; H04W 24/08; H04W 28/04; H04W 28/06; H04W 92/20; H04W 36/0069; H04L 1/18
See application file for complete search history.

(56) References Cited

U.S. PATENT DOCUMENTS

2002/0167900 A1* 11/2002 Mark ...................... H04L 45/28
370/225
2005/0073958 A1* 4/2005 Atlas ...................... H04L 45/22
370/238
(Continued)

FOREIGN PATENT DOCUMENTS

CN        1913691 A     2/2007
CN      101355502 A     1/2009
(Continued)

OTHER PUBLICATIONS

Notice of Reasons for Refusal from JP app. No. 2019-522447, dated Jul. 7, 2020, with English translation provided by Global Dossier.
(Continued)

*Primary Examiner* — Michael J Moore, Jr.
(74) *Attorney, Agent, or Firm* — Ladas & Parry, LLP

(57) ABSTRACT

An information processing method and device are provided. The information processing method includes: obtaining link state information of a target link; determining whether link exception exists in the target link or not according to the link state information; and when the link exception is determined to exist in the target link, transmitting link exception indication information to a primary node, wherein the link exception indication information is used to indicate to the primary node that the link exception exists in the target link.

10 Claims, 5 Drawing Sheets

(51) Int. Cl.
  H04L 1/18    (2006.01)
  H04W 76/15   (2018.01)
  H04W 28/06   (2009.01)
  H04W 92/20   (2009.01)
  H04W 28/04   (2009.01)
  H04W 36/00   (2009.01)

(52) U.S. Cl.
  CPC .......... *H04W 28/06* (2013.01); *H04W 76/15* (2018.02); *H04W 92/20* (2013.01); *H04W 36/0069* (2018.08)

(56) References Cited

U.S. PATENT DOCUMENTS

| | | | | |
|---|---|---|---|---|
| 2006/0067273 | A1* | 3/2006 | Suman | H04W 80/00 370/331 |
| 2006/0218298 | A1* | 9/2006 | Knapp | H04W 40/12 709/238 |
| 2008/0052394 | A1* | 2/2008 | Bugenhagen | H04L 45/22 709/224 |
| 2012/0300701 | A1* | 11/2012 | Uemura | H04L 41/0668 370/328 |
| 2013/0142092 | A1* | 6/2013 | Kikuzuki | H04W 40/34 370/310 |
| 2015/0045035 | A1 | 2/2015 | Nigam et al. | |
| 2015/0326456 | A1 | 11/2015 | Dudda et al. | |
| 2019/0098606 | A1* | 3/2019 | Sharma | H04B 7/0404 |
| 2019/0182691 | A1* | 6/2019 | Wang | H04W 76/19 |
| 2019/0230569 | A1* | 7/2019 | Kim | H04W 36/32 |

FOREIGN PATENT DOCUMENTS

| | | |
|---|---|---|
| CN | 101483927 A | 7/2009 |
| CN | 101873655 A | 10/2010 |
| CN | 101965009 A | 2/2011 |
| CN | 101998469 A | 3/2011 |
| CN | 102932820 A | 2/2013 |
| CN | 104640232 A | 5/2015 |
| CN | 105103594 A | 11/2015 |
| CN | 105594251 A | 5/2016 |
| CN | 105960772 A | 9/2016 |
| JP | 2015177400 A | 10/2015 |
| KR | 20110016749 A | 2/2011 |
| KR | 20150111950 A | 10/2015 |
| WO | 2014132560 A1 | 9/2014 |
| WO | 2015064728 A1 | 5/2015 |

OTHER PUBLICATIONS

Notification of Reason for Refusal from KR app. No. 10-2019-7014322, dated May 12, 2020, with English translation provided by Global Dossier.
"Details on S-RLF", R2-143540, 3GPP TSG-RAN WG2 Meeting #87, Dresden, Germany, Aug. 18-22, 2014.
Necessity of PDCP status report on S-RLF, R2-144386, 3GP TSG-RAN WG2 Meeting #87bis, Shanghai, China, Oct. 6-10, 2014.
"Report and summary of email discussion [87#22][LTE/DC] S-RLF and Reestablishment" R2-144540, 3GPP TSG-RAN WG2 Meeting #87, Shanghai, China, Oct. 6-10, 2014.
"Remaining Issues on PDCP Reports for S-RLF", R2-145084, 3GPP TSG-RAN WG2 meeting #88, San Francisco, CA, Nov. 17-21, 2014.
International Search Report for PCT/CN2017/109084 dated Dec. 25, 2017 and its English translation provided by WIPO.
Written Opinion of the International Searching Authority for PCT/CN2017/109084 dated Dec. 25, 2017 and its English translation provided by Google Translate.
First Office Action and Search Report from CN app. No. 201610962991.0, dated Dec. 21, 2018, with English translation from Global Dossier.
Second Office Action and Search Report from CN app. No. 201610962991.0, dated Jun. 25, 2019, with English translation from Global Dossier.
Third Office Action and Search Report from CN app. No. 201610962991.0, dated Oct. 9, 2019, with English translation from Global Dossier.
Written Opinion of the International Searching Authority from PCT/CN2017/109084, dated Dec. 25, 2017, with English translation from WIPO.
International Preliminary Report on Patentability from PCT/CN2017/109084, dated May 7, 2019, with English translation from WIPO.
Extended European Search Report from EP app. No. 17867855.3, dated Sep. 17, 2019.
"PDCP SN delivery under dual connectivity" R2-142336, 3GPP TSG-RAN WG2 Meeting #86, Seoul, Korea, May 19-23, 2014.
"PDCP feedback and flow control", R2-142399, 3GPP TSG-RAN WG2 Meeting #86, Seoul, Korea, May 19-23, 2014.
"PDCP Reordering Issues for UL Split Bearer", R2-152223, 3GPP TSG-RAN WG2 Meeting #90, Fukuoka, Japan, May 25-29, 2015.
"Flow control in LTE-WLAN Aggregation", R2-154765, 3GPP TSG-RAN WG2 #91bis, Malmo, Sweden, Oct. 5-9, 2015.
"Introduction of LWA into PDCP specification", R2-162043, 3GPP TSG-RAN2 Meeting 93, St. Julian's, Malta, Feb. 15-19, 2016.

* cited by examiner

INFORMATION PROCESSING METHOD AND DEVICE

CROSS-REFERENCE TO RELATED APPLICATIONS

This application is a U.S. national phase application of PCT Application No. PCT/CN2017/109084 filed on Nov. 2, 2017, which claims a priority to a Chinese patent application No. 201610962991.0 filed in China on Nov. 4, 2016, the disclosures of which are incorporated herein in their entireties by reference.

TECHNICAL FIELD

The present disclosure relates to the field of communication technology, and in particular, relates to an information processing method and an information processing device.

BACKGROUND

A forthcoming mobile communication system will support a larger transmission bandwidth and a higher transmission rate, wherein the transmission bandwidth may be in an order of Giga Hertz (GHz), and the transmission rate may be in an order of ten Giga bits per second (Gbps). For purpose of handling above scenarios, a scenario in which a large amount of high-frequency micro cells are deployed will be a common deployment scenario. In order to coordinate the micro cells and enable the micro cells to operate effectively, it is a good solution for enhancing a system efficiency and satisfying a user experience that a central node for performing a uniform management function and acting as a data anchor node is deployed.

In a relevant communication system, a data transmission between a User Equipment (UE) and an evolved Node B (eNB) is generally implemented through a Packet Data Convergence Protocol (PDCP) layer, a Radio Link Control (RLC) layer, a Media Access Control (MAC) layer, and a Physical Layer (PHY). Directed to a scene in which a Primary cell and a Secondary cell are overlapped and uses same or different frequencies or a non-ideal scene in which only a backhaul link exists between a secondary cell and a coverage cell, a dual-connection technique is introduced. The dual-connection refers to a case in which a plurality of network nodes having non-ideal backhaul links provide radio resources for a UE. That is, the UE keeps air-interface connections with both a Master eNB (MeNB) and a Secondary eNB (SeNB), and this means that both the MeNB and the SeNB may provide services to the UE.

In an architecture based on the dual-connection, data of a user may be divided between different eNBs and separately processed by the two eNBs below the RLC layer. In such an architecture, traffic control is performed between the SeNB and the MeNB through signalings at an X2 interface, and feedback being failed is transmitted through the X2 interface.

SUMMARY

An information processing method and an information processing device are provided in the present disclosure so as to ensure normal data transmission.

In a first aspect, an information processing method is provided in the present disclosure and includes: obtaining link state information of a target link; determining whether a link exception exists in the target link or not according to the link state information; and in a case that the link exception is determined to exist in the target link, transmitting link exception indication information to a primary node, wherein the link exception indication information is used to indicate to the primary node that the link exception exists in the target link.

Optionally, the determining whether the link exception exists in the target link or not according to the link state information, includes: judging whether the link state information satisfies a pre-determined link deterioration condition or not; and in a case that the link state information satisfies the pre-determined link deterioration condition, determining that the link exception exists in the target link.

Optionally, the link exception indication information includes at least one of link quality deterioration indication information or data transmission state information.

Optionally, in a case that the link exception indication information includes the data transmission state information, the data transmission state information includes: sequence numbers of contents in a first type of data packets, sequence numbers of contents in a second type of data packets, and sequence numbers of contents in a third type of data packets; wherein, the contents in the first type of data packets include Packet Data Convergence Protocol (PDCP) Protocol Data Units (PDUs) having been transmitted through an air-interface and acknowledged by a correspondence end; the contents in the second type of data packets include PDCP PDUs having been transmitted through the air-interface but not being acknowledged by the correspondence end; the contents in the third type of data packets include PDCP PDUs not being transmitted through the air-interface; or the contents in the first type of data packets include Radio Link Control (RLC) PDUs having been transmitted through the air-interface and acknowledged by the correspondence end; the contents in the second type of data packets include RLC PDUs having been transmitted through the air-interface but not being acknowledged by the correspondence end; the contents in the third type of data packets include RLC PDUs having not been transmitted through the air-interface.

Optionally, in a case that the link exception indication information includes the data transmission state information, the data transmission state information includes a maximum sequence number corresponding to contents in a first type of data packets, and a maximum sequence number corresponding to contents in a second type of data packets; the maximum sequence number corresponding to contents in the first type of data packets is smaller than or equal to the maximum sequence number corresponding to contents in the second type of data packets, wherein the contents in the first type of data packets include: Packet Data Convergence Protocol (PDCP) Protocol Data Units (PDUs) having been transmitted through the air-interface continuously and acknowledged by a correspondence end; the contents in the second type of data packets include: PDCP PDUs having been transmitted through the air-interface; or the contents in the first type of data packets include: Radio Link Control (RLC) PDUs having been transmitted through the air-interface continuously and acknowledged by the correspondence end; the contents in the second type of data packets include RLC PDUs having been transmitted through the air-interface.

Optionally, the data transmission state information further includes: a maximum sequence number corresponding to contents of data packets assigned by the primary node; and/or sequence numbers of contents in a fourth type of data packets; the sequence numbers of contents in the fourth type of data packets are larger than the maximum sequence number corresponding to contents in the first type of data packets and smaller than the maximum sequence number corresponding to contents in the second type of data packets; and the contents in the fourth type of data packets include PDCP PDUs or RLC PDUs having been transmitted through the air-interface and acknowledged (ACK) by the correspondence end.

Optionally, in a case that the link exception indication information includes the data transmission state information, the data transmission state information includes a maximum sequence number corresponding to contents in a fifth type of data packets, and sequence numbers of contents in a second type of data packets; the sequence numbers of contents in the second type of data packets are smaller than the maximum sequence number corresponding to the contents in the fifth type of data packets; the contents in the fifth type of data packets include Packet Data Convergence Protocol (PDCP) Protocol Data Units (PDUs) having been transmitted through an air-interface, and the contents in the second type of data packets include PDCP PDUs having been transmitted through the air-interface but not being acknowledged (ACK) by a correspondence end; or the contents in the fifth type of data packets include Radio Link Control (RLC) PDUs having been transmitted through the air-interface; the contents in the second type of data packets include RLC PDUs having been transmitted through the air-interface but not being acknowledged by the correspondence end.

Optionally, in a case that the link exception indication information includes the data transmission state information, the data transmission state information includes sequence numbers of contents of data packets having been transmitted through an air-interface and/or sequence numbers of contents of data packets not being transmitted through the air-interface; the contents of data packets having been transmitted through the air-interface include Packet Data Convergence Protocol (PDCP) Protocol Data Units (PDUs) having been transmitted through the air-interface; the contents of data packets not being transmitted through the air-interface include PDCP PDUs not being transmitted through the air-interface; or the contents of data packets having been transmitted through the air-interface include Radio Link Control (RLC) PDUs having been transmitted through the air-interface; the contents of data packets not being transmitted through the air-interface include RLC PDUs not being transmitted through the air-interface.

Optionally, in a case that the link exception indication information includes the data transmission state information, the data transmission state information includes a maximum sequence number corresponding to contents of data packets having been transmitted through an air-interface, and the contents of data packets having been transmitted through the air-interface include Radio Link Control (RLC) Protocol Data Units (PDUs) having been transmitted through the air-interface.

Optionally, after the transmitting the link exception indication information to the primary node, the method further includes: under a condition that the link state information of the target link satisfies a predetermined link recovery condition, transmitting link quality recovery indication information to the primary node.

Optionally, the method further includes stopping data transmission in the target link.

Optionally, before the stopping data transmission in the target link, the method further includes: receiving a state-report acknowledging message transmitted by the primary node; the stopping data transmission in the target link specifically includes stopping the data transmission in the target link according to the state-report acknowledging message.

Optionally, after the stopping data transmission in the target link, the method further includes: resetting the target link and performing data transmission by means of the reset target link.

Optionally, before the resetting the target link and performing data transmission by means of the reset target link, the method further includes: receiving a link recovery acknowledge message transmitted by the primary node; the resetting the target link and performing data transmission by means of the reset target link, specifically include: resetting the target link according to the link recovery acknowledge message, and performing the data transmission by means of the reset target link.

In a second aspect, an information processing method is provided in the present disclosure and includes receiving link exception indication information transmitted by a secondary node, wherein the link exception indication information is used to indicate that a link exception exists in a target link; and selecting an alternative link for the target link according to the link exception indication information, and processing data related to the target link in the alternative link.

Optionally, the link exception indication information includes at least one of link quality deterioration indication information or data transmission state information.

Optionally, in a case that the link exception indication information includes the data transmission state information, after the receiving link exception indication information transmitted by the secondary node, the method further includes: determining, according to the data transmission state information, data to be processed; the processing data related to the target link in the alternative link, includes: processing the data to be processed in the alternative link.

Optionally, the data transmission state information includes: sequence numbers of contents in a first type of data packets, sequence numbers of contents in a second type of data packets, and sequence numbers of contents in a third type of data packets. The determining, according to the data transmission state information, data to be processed, includes: taking the contents in the second type of data packets and the contents in the third type of data packets as the data to be processed, according to the sequence numbers of the contents in the second type of data packets and the sequence numbers of the contents in the third type of data packets. The processing data related to the target link in the alternative link, includes: re-transmitting the contents in the second type of data packets in the alternative link, and transmitting the contents in the third type of data packets in the alternative link; wherein, the contents in the first type of data packets include Packet Data Convergence Protocol (PDCP) Protocol Data Units (PDUs) having been transmitted through an air-interface and acknowledged (ACK) by a correspondence end; the contents in the second type of data packets include PDCP PDUs having been transmitted through the air-interface but not being acknowledged by the correspondence end; the contents in the third type of data packets include PDCP PDUs not being transmitted through the air-interface; or the contents in the first type of data packets include Radio Link Control (RLC) PDUs having been transmitted through the air-interface and acknowledged by the correspondence end; the contents in the second type of data packets include RLC PDUs having been transmitted through the air-interface but not being acknowledged by the correspondence end; the contents in the third type of data packets include RLC PDUs having not been transmitted through the air-interface.

Optionally, the data transmission state information includes a maximum sequence number corresponding to contents in a first type of data packets, and a maximum sequence number corresponding to contents in a second type of data packets; the maximum sequence number corresponding to contents in the first type of data packets is smaller than or equal to the maximum sequence number corresponding to contents in the second type of data packets. The determining, according to the data transmission state information, data to be processed, includes: determining contents of data packets needing to be re-transmitted and contents of data packets needing to be transmitted in contents of all data packets assigned to the secondary node, according to the maximum sequence number corresponding to the contents in the first type of data packets and the maximum sequence number corresponding to contents in the second type of data packets, wherein sequence numbers of contents of data packets needing to be re-transmitted are larger than the maximum sequence number corresponding to the contents in the first type of data packets and smaller than the maximum sequence number corresponding to contents in the second type of data packets; the sequence numbers of contents of data packets needing to be transmitted are larger than the maximum sequence number corresponding to the contents in the second type of data packets. The processing data related to the target link in the alternative link, includes: re-transmitting the contents of data packets needing to be re-transmitted in the alternative link, and transmitting the contents of data packets needing to be transmitted in the alternative link; wherein the contents in the first type of data packets include: Packet Data Convergence Protocol (PDCP) Protocol Data Units (PDUs) having been transmitted through an air-interface continuously and acknowledged (ACK) by a correspondence end; the contents in the second type of data packets include PDCP PDUs having been transmitted through the air-interface; or the contents in the first type of data packets include: Radio Link Control (RLC) PDUs having been transmitted through the air-interface continuously and acknowledged by the correspondence end; the contents in the second type of data packets include RLC PDUs having been transmitted through the air-interface.

Optionally, the data transmission state information further includes: a maximum sequence number corresponding to contents of data packets assigned to the secondary node, and/or sequence numbers of contents in a fourth type of data packets; the sequence numbers of contents of data packets needing to be transmitted are smaller than the maximum sequence number corresponding to contents of data packets assigned to the secondary node; the sequence numbers of contents in the fourth type of data packets are larger than the maximum sequence number corresponding to contents in the first type of data packets and smaller than the maximum sequence number corresponding to contents in the second type of data packets; and the contents in the fourth type of data packets include PDCP PDUs or RLC PDUs having been transmitted through the air-interface and acknowledged (ACK) by the correspondence end; the contents of the data packets needing to be re-transmitted are contents of data packets other than the fourth type of data packets.

Optionally, the data transmission state information includes a maximum sequence number corresponding to contents in a fifth type of data packets, and sequence numbers of contents in a second type of data packets; the sequence numbers of contents in the second type of data packets are smaller than the maximum sequence number corresponding to the contents in the fifth type of data packets. The determining, according to the data transmission state information, data to be processed, includes: determining contents of data packets needing to be re-transmitted and contents of data packets needing to be transmitted, according to the maximum sequence number corresponding to the contents in the first type of data packets and the sequence numbers of contents in the second type of data packets; wherein the contents in the second type of data packets are taken as the contents of data packets needing to be re-transmitted; contents of data packets having sequence numbers larger than the maximum sequence number corresponding to the contents in the fifth type of data packets, in contents of all data packets assigned to the secondary node, are taken as the contents of data packets needing to be transmitted. The transmitting the data related to the target link in the alternative link, includes: re-transmitting the contents of data packets needing to be re-transmitted in the alternative link, and transmitting the contents of data packets needing to be transmitted in the alternative link; wherein the contents in the fifth type of data packets include Packet Data Convergence Protocol (PDCP) Protocol Data Units (PDUs) having been transmitted through an air-interface, and the contents in the second type of data packets include PDCP PDUs having been transmitted through the air-interface but not being acknowledged (ACK) by a correspondence end; or the contents in the fifth type of data packets include Radio Link Control (RLC) PDUs having been transmitted through the air-interface; the contents in the second type of data packets include RLC PDUs having been transmitted through the air-interface but not being acknowledged by the correspondence end.

Optionally, the data transmission state information includes sequence numbers of contents of data packets having been transmitted through an air-interface and/or sequence numbers of contents of data packets not being transmitted through the air-interface. The determining, according to the data transmission state information, data to be processed, includes: taking, as the data to be processed, the contents of data packets not being transmitted through the air-interface, according to at least one of (i) the sequence numbers of contents of data packets having been transmitted through the air-interface or (ii) the sequence numbers of contents of data packets not being transmitted through the air-interface; wherein, the contents of data packets having been transmitted through the air-interface include Packet Data Convergence Protocol (PDCP) Protocol Data Units (PDUs) having been transmitted through the air-interface; the contents of data packets not being transmitted through the air-interface include PDCP PDUs not being transmitted through the air-interface; or the contents of data packets having been transmitted through the air-interface include Radio Link Control (RLC) PDUs having been transmitted through the air-interface; the contents of data packets not being transmitted through the air-interface include RLC PDUs not being transmitted through the air-interface.

Optionally, the data transmission state information includes a maximum sequence number corresponding to contents of data packets having been transmitted through an air-interface, and the contents of data packets having been transmitted through the air-interface include Radio Link Control (RLC) Protocol Data Units (PDUs) having been transmitted through the air-interface. The determining, according to the data transmission state information, data to be processed, includes: taking, as data to be processed, contents of data packets having sequence numbers larger than the maximum sequence number corresponding to contents of data packets having been transmitted through the air-interface, in contents of all data packets assigned to the secondary node.

Optionally, the method further includes: receiving link quality recovery indication information transmitted by the secondary node.

Optionally, the method further includes: transmitting a state-report acknowledging message to the secondary node; and/or transmitting a link recovery acknowledge message to the secondary node.

In a third aspect, an information processing device is provided in the present disclosure and includes: an information obtaining module, configured for obtaining link state information of a target link; an information judgement module, configured for determining whether a link exception exists in the target link or not according to the link state information; an information transmission module, configured for, in a case that the link exception is determined to exist in the target link, transmitting link exception indication information to a primary node, wherein the link exception indication information is used to indicate to the primary node that the link exception exists in the target link.

Optionally, the information judgement module includes: a judging submodule, configured for judging whether the link state information satisfies a pre-determined link deterioration condition or not; and a determination submodule, configured for, in a case that the link state information satisfies the pre-determined link deterioration condition, determining that the link exception exists in the target link.

Optionally, the link exception indication information includes at least one of link quality deterioration indication information or data transmission state information.

Optionally, in a case that the link exception indication information includes the data transmission state information, the data transmission state information transmitted by the information transmission module includes: sequence numbers of contents in a first type of data packets, sequence numbers of contents in a second type of data packets, and sequence numbers of contents in a third type of data packets; wherein, the contents in the first type of data packets include Packet Data Convergence Protocol (PDCP) Protocol Data Units (PDUs) having been transmitted through an air-interface and acknowledged (ACK) by a correspondence end; the contents in the second type of data packets include PDCP PDUs having been transmitted through the air-interface but not being acknowledged by the correspondence end; the contents in the third type of data packets include PDCP PDUs not being transmitted through the air-interface; or the contents in the first type of data packets include Radio Link Control (RLC) PDUs having been transmitted through the air-interface and acknowledged by the correspondence end; the contents in the second type of data packets include RLC PDUs having been transmitted through the air-interface but not being acknowledged by the correspondence end; the contents in the third type of data packets include RLC PDUs having not been transmitted through the air-interface.

Optionally, in a case that the link exception indication information includes the data transmission state information, the data transmission state information transmitted by the information transmission module includes a maximum sequence number corresponding to contents in a first type of data packets, and a maximum sequence number corresponding to contents in a second type of data packets; the maximum sequence number corresponding to contents in the first type of data packets is smaller than or equal to the maximum sequence number corresponding to contents in the second type of data packets; wherein the contents in the first type of data packets include Packet Data Convergence Protocol (PDCP) Protocol Data Units (PDUs) having been transmitted through an air-interface continuously and acknowledged (ACK) by a correspondence end; the contents in the second type of data packets include PDCP PDUs having been transmitted through the air-interface; or the contents in the first type of data packets include: Radio Link Control (RLC) PDUs having been transmitted through the air-interface continuously and acknowledged by the correspondence end; the contents in the second type of data packets include RLC PDUs having been transmitted through the air-interface.

Optionally, the data transmission state information transmitted by the information transmission module further includes: a maximum sequence number corresponding to contents of data packets assigned by the primary node; and/or sequence numbers of contents in a fourth type of data packets; the sequence numbers of contents in the fourth type of data packets are larger than the maximum sequence number corresponding to contents in the first type of data packets and smaller than the maximum sequence number corresponding to contents in the second type of data packets; and the contents in the fourth type of data packets include PDCP PDUs or RLC PDUs having been transmitted through the air-interface and acknowledged (ACK) by the correspondence end.

Optionally, in a case that the link exception indication information includes the data transmission state information, the data transmission state information transmitted by the information transmission module includes a maximum sequence number corresponding to contents in a fifth type of data packets, and sequence numbers of contents in a second type of data packets; the sequence numbers of contents in the second type of data packets are smaller than the maximum sequence number corresponding to the contents in the fifth type of data packets; the contents in the fifth type of data packets include Packet Data Convergence Protocol (PDCP) Protocol Data Units (PDUs) having been transmitted through an air-interface, and the contents in the second type of data packets include PDCP PDUs having been transmitted through the air-interface but not being acknowledged (ACK) by a correspondence end; or the contents in the fifth type of data packets include Radio Link Control (RLC) PDUs having been transmitted through the air-interface; the contents in the second type of data packets include RLC PDUs having been transmitted through the air-interface but not being acknowledged by the correspondence end.

Optionally, in a case that the link exception indication information includes the data transmission state information, the data transmission state information transmitted by the information module includes at least one of (i) sequence numbers of contents of data packets having been transmitted through an air-interface or (ii) sequence numbers of contents of data packets not being transmitted through the air-interface; the contents of data packets having been transmitted through the air-interface include Packet Data Convergence Protocol (PDCP) Protocol Data Units (PDUs) having been transmitted through the air-interface; the contents of data packets not being transmitted through the air-interface include PDCP PDUs not being transmitted through the air-interface; or the contents of data packets having been transmitted through the air-interface include Radio Link Control (RLC) PDUs having been transmitted through the air-interface; the contents of data packets not being transmitted through the air-interface include RLC PDUs not being transmitted through the air-interface.

Optionally, in a case that the link exception indication information includes the data transmission state information, the data transmission state information transmitted by the information transmission module includes a maximum sequence number corresponding to contents of data packets having been transmitted through an air-interface, and the contents of data packets having been transmitted through the air-interface include Radio Link Control (RLC) Protocol Data Units (PDUs) having been transmitted through the air-interface.

Optionally, the information transmission module is further configured for, under a condition that the link state information of the target link satisfies a predetermined link recovery condition, transmitting link quality recovery indication information to the primary node.

Optionally, the device further includes a first information processing module, configured for stopping data transmission in the target link.

Optionally, the device further includes a first information reception module, configured for receiving a state-report acknowledging message transmitted by the primary node, wherein the first information processing module is specifically configured for stopping the data transmission in the target link according to the state-report acknowledging message.

Optionally, the device further includes a reset module, configured for resetting the target link and performing data transmission by means of the reset target link.

Optionally, the device further includes a second information reception module, configured for receiving a link recovery acknowledge message transmitted by the primary node, wherein the reset module is specifically configured for resetting the target link according to the link recovery acknowledge message, and performing the data transmission by means of the reset target link.

In a fourth aspect, an information processing device is provided in the present disclosure and includes: an information reception module, configured for receiving link exception indication information transmitted by a secondary node, wherein the link exception indication information is used to indicate that a link exception exists in a target link; and an information processing module, configured for selecting an alternative link for the target link according to the link exception indication information, and processing data related to the target link in the alternative link.

Optionally, the link exception indication information includes at least one of link quality deterioration indication information or data transmission state information.

Optionally, in a case that the link exception indication information includes the data transmission state information, the device further includes: an information determination module, configured for determining, according to the data transmission state information, data to be processed; the information processing module is specifically configured for selecting the alternative link for the target link according to the link exception indication information, and processing data to be processed in the alternative link.

Optionally, the data transmission state information includes: sequence numbers of contents in a first type of data packets, sequence numbers of contents in a second type of data packets, and sequence numbers of contents in a third type of data packets; the information determination module is specifically configured for taking the contents in the second type of data packets and the contents in the third type of data packets as the data to be processed, according to the sequence numbers of the contents in the second type of data packets and the sequence numbers of the contents in the third type of data packets; the information processing module is specifically configured for re-transmitting the contents in the second type of data packets in the alternative link, and transmitting the contents in the third type of data packets in the alternative link; wherein, the contents in the first type of data packets include Packet Data Convergence Protocol (PDCP) Protocol Data Units (PDUs) having been transmitted through an air-interface and acknowledged (ACK) by a correspondence end; the contents in the second type of data packets include PDCP PDUs having been transmitted through the air-interface but not being acknowledged by the correspondence end; the contents in the third type of data packets include PDCP PDUs not being transmitted through the air-interface; or the contents in the first type of data packets include Radio Link Control (RLC) PDUs having been transmitted through the air-interface and acknowledged by the correspondence end; the contents in the second type of data packets include RLC PDUs having been transmitted through the air-interface but not being acknowledged by the correspondence end; the contents in the third type of data packets include RLC PDUs having not been transmitted through the air-interface.

Optionally, the data transmission state information includes a maximum sequence number corresponding to contents in a first type of data packets, and a maximum sequence number corresponding to contents in a second type of data packets; the maximum sequence number corresponding to contents in the first type of data packets is smaller than or equal to the maximum sequence number corresponding to contents in the second type of data packets. The information determination module is specifically configured for determining contents of data packets needing to be re-transmitted and contents of data packets needing to be transmitted in contents of all data packets assigned to the secondary node, according to the maximum sequence number corresponding to the contents in the first type of data packets and the maximum sequence number corresponding to contents in the second type of data packets, wherein the sequence numbers of contents of data packets needing to be re-transmitted are larger than the maximum sequence number corresponding to the contents in the first type of data packets and smaller than the maximum sequence number corresponding to contents in the second type of data packets; the sequence numbers of contents of data packets needing to be transmitted are larger than the maximum sequence number corresponding to the contents in the second type of data packets. The information processing module is specifically configured for re-transmitting the contents of data packets needing to be re-transmitted in the alternative link, and transmitting the contents of data packets needing to be transmitted in the alternative link; wherein the contents in the first type of data packets include: Packet Data Convergence Protocol (PDCP) Protocol Data Units (PDUs) having been transmitted through an air-interface continuously and acknowledged (ACK) by a correspondence end; the contents in the second type of data packets include PDCP PDUs having been transmitted through the air-interface; or the contents in the first type of data packets include: Radio Link Control (RLC) PDUs having been transmitted through the air-interface continuously and acknowledged by the correspondence end; the contents in the second type of data packets include RLC PDUs having been transmitted through the air-interface.

Optionally, the data transmission state information further includes: a maximum sequence number corresponding to contents of data packets assigned to the secondary node, and/or sequence numbers of contents in a fourth type of data packets; the sequence numbers of contents of data packets needing to be transmitted are smaller than the maximum sequence number corresponding to contents of data packets assigned to the secondary node; the sequence numbers of contents in the fourth type of data packets are larger than the maximum sequence number corresponding to contents in the first type of data packets and smaller than the maximum sequence number corresponding to contents in the second type of data packets; and the contents in the fourth type of data packets include PDCP PDUs or RLC PDUs having been transmitted through the air-interface and acknowledged (ACK) by the correspondence end; the contents of the data packets needing to be re-transmitted are contents of data packets other than the fourth type of data packets.

Optionally, the data transmission state information includes a maximum sequence number corresponding to contents in a fifth type of data packets, and sequence numbers of contents in a second type of data packets; the sequence numbers of contents in the second type of data packets are smaller than the maximum sequence number corresponding to the contents in the fifth type of data packets. The information determination module is specifically configured for, determining contents of data packets needing to be re-transmitted and contents of data packets needing to be transmitted, according to the maximum sequence number corresponding to the contents in the first type of data packets and the sequence numbers of contents in the second type of data packets; wherein the contents in the second type of data packets are taken as the contents of data packets needing to be re-transmitted; contents of data packets having sequence numbers larger than the maximum sequence number corresponding to the contents in the fifth type of data packets, in contents of all data packets assigned to the secondary node, are taken as the contents of data packets needing to be transmitted; the information processing module is specifically configured for re-transmitting the contents of data packets needing to be re-transmitted in the alternative link, and transmitting the contents of data packets needing to be transmitted in the alternative link; wherein the contents in the fifth type of data packets include Packet Data Convergence Protocol (PDCP) Protocol Data Units (PDUs) having been transmitted through an air-interface, and the contents in the second type of data packets include PDCP PDUs having been transmitted through the air-interface but not being acknowledged (ACK) by a correspondence end; or the contents in the fifth type of data packets include Radio Link Control (RLC) PDUs having been transmitted through the air-interface; the contents in the second type of data packets include RLC PDUs having been transmitted through the air-interface but not being acknowledged by the correspondence end.

Optionally, the data transmission state information includes sequence numbers of contents of data packets having been transmitted through an air-interface and/or sequence numbers of contents of data packets not being transmitted through the air-interface; the information determination module is specifically configured for taking, as the data to be processed, the contents of data packets not being transmitted through the air-interface, according to at least one of (i) the sequence numbers of contents of data packets having been transmitted through the air-interface or (ii) the sequence numbers of contents of data packets not being transmitted through the air-interface; wherein, the contents of data packets having been transmitted through the air-interface include Packet Data Convergence Protocol (PDCP) Protocol Data Units (PDUs) having been transmitted through the air-interface; the contents of data packets not being transmitted through the air-interface include PDCP PDUs not being transmitted through the air-interface; or the contents of data packets having been transmitted through the air-interface include Radio Link Control (RLC) PDUs having been transmitted through the air-interface; the contents of data packets not being transmitted through the air-interface include RLC PDUs not being transmitted through the air-interface.

Optionally, the data transmission state information includes a maximum sequence number corresponding to contents of data packets having been transmitted through an air-interface, and the contents of data packets having been transmitted through the air-interface include Radio Link Control (RLC) Protocol Data Units (PDUs) having been transmitted through the air-interface; the information determination module is specifically configured for taking, as data to be processed, contents of data packets having sequence numbers larger than the maximum sequence number corresponding to contents of data packets having been transmitted through the air-interface, in contents of all data packets assigned to the secondary node.

Optionally, the information reception module is further configured for receiving link quality recovery indication information transmitted by the secondary node.

Optionally, the device further includes an information transmission module, configured for transmitting a state-report acknowledging message to the secondary node; and/or transmitting a link recovery acknowledge message to the secondary node.

In a fifth aspect, an information processing device is provided in the present disclosure and includes: a processing, and a storage, connected to the processor through a bus interface and configured for storing programs and data, wherein, when the processor invokes and executes the programs and the data stored in the storage, the processor implements the method according to the first aspect.

In a sixth aspect, an information processing device is provided in the present disclosure and includes: a processing, and a storage, connected to the processor through a bus interface and configured for storing programs and data, wherein, when the processor invokes and executes the programs and the data stored in the storage, the processor implements the method according to the second aspect.

In a seventh aspect, a non-volatile storage medium is provided in the present disclosure and includes: programs and data stored on the non-volatile storage medium, wherein when the programs and the data are executed by the processor, the processor implements the method according to the first aspect.

In an eighth aspect, a non-volatile storage medium is provided in the present disclosure and includes: programs and data stored on the non-volatile storage medium, wherein when the programs and the data are executed by the processor, the processor implements the method according to the second aspect.

DETAILED DESCRIPTION

Detailed description of the present disclosure will be given hereinafter in conjunction with drawings and the embodiments of the present disclosure. The following embodiments are used to illustrate the present disclosure, but do not limit the scope of the present disclosure.

Figure 1:
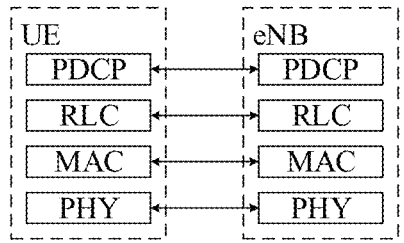
FIG. 1 is a schematic diagram of a user-plane protocol stack in a relevant mobile communication system.

FIG. 1 is a schematic diagram of a user-plane protocol stack in a relevant mobile communication system. As shown in FIG. 1, each of layers in FIG. 1 implements different data processing functions. A security operation and a header compression-decompression processing, such as encryption and integrity protection and Robust Header Compression (ROHC) compressions and decompressions, are mainly performed at a Packet Data Convergence Protocol (PDCP) layer. Data segmentation, data cascade, sequential transmission and Automatic Repeat ReQuest (ARQ) for ensuring data transmission are mainly performed at a Radio Link Control (RLC) layer. Scheduling, cascade processing for different logical channels and Hybrid Automatic Repeat reQuest (HARQ) operations are mainly performed at a Media Access Control (MAC) layer. Transmission blocks are encapsulated and transmitted through an air-interface at a physical layer.

In related art, a traffic control mechanism for an X2 interface is focused on controlling traffic between a Master eNB (MeNB, for short) and a Secondary eNB (SeNB, for short) and feeding back a result of a transmission performed through the X2 interface. However, the mechanism in the related art is not sufficient. For example, if transmissions on a link are broken for many times within a time interval, and a correct transmission cannot be performed due to conditions such as discontinued transmissions, the traffic control mechanism for the X2 interface in the related art cannot properly work in such conditions, causing transmission in this link to be deteriorated and data assigned to the link cannot be correctly transmitted.

A main concept of the embodiments of the present disclosure is as follows: in a scene of multi-connectivity and bearer separation, if one link related to a secondary node meets a deterioration condition, the secondary node may transmit a link deterioration indication to a primary node or transmit a data transmission condition of a link to the primary node, so that the primary node may correctly orchestrate all data packets having not been transmitted or having not been transmitted successfully for a purpose of re-transmission of the data packets. If the link reaches a recovery condition, the secondary node transmits a link recovery indication to the primary node, so that the primary node may continue to orchestrate data for transmission in the link.

Based on the above core concept of feeding back a transmission state between the two nodes, the two nodes may interchange link conditions and data transmission states efficiently between the two nodes. If an exception is generated in one link, transmission in the link may be continued in another link so as to handle a deteriorated link and actively address the exception and prevent user data experience from being broken down. A complexity of a recovery processing procedure is reduced and a processing efficiency for data packets at a Layer 2 is increased and thus is applicable to deployment scenes such as a CU/DU scene or a multi-connectivity in a forthcoming fifth generation (5G) communication system.

Generally, the primary node is a main centralized anchor node for data. In an architecture of dual-connectivity or multi-connectivity, the primary node refers to a MeNB and the secondary node refers to a SeNB. In a CU/DU architecture, the primary node refers to a CU (Central Unit) node and the secondary node refers to a DU (Distributed Unit).

Figure 2:
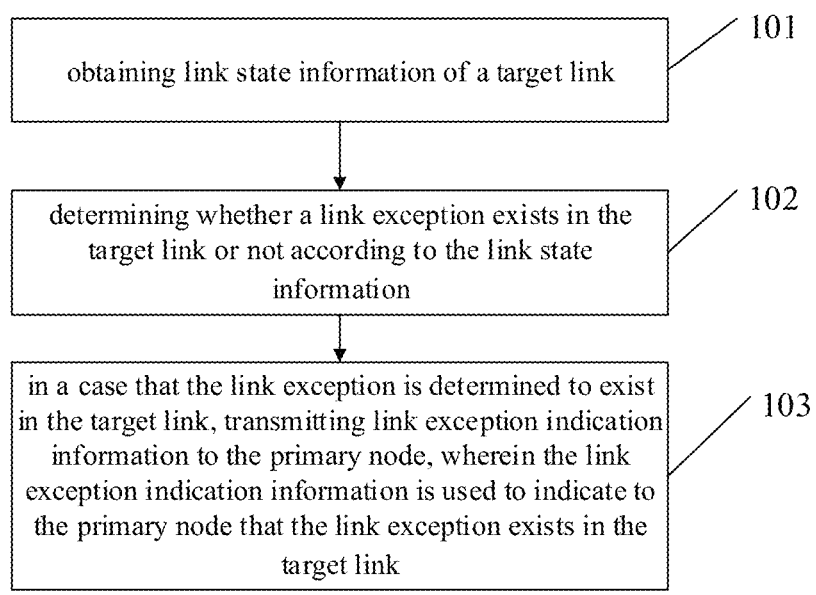
FIG. 2 is a flowchart of an information processing method in some embodiments of the present disclosure.

FIG. 2 is a flowchart of an information processing method in some embodiments of the present disclosure. The information processing method provided in the FIG. 2 is applied to the secondary node. The secondary node includes, but is not limited to, the SeNB or the DU. The information processing method includes steps 101-103.

Step 101: obtaining link state information of a target link.

In a specific application, the secondary node may monitor states of links connected with the secondary node, so as to obtain link state information of each of the links. Any one of the links may be the target link herein.

The link state information includes, but is not limited to: a quality monitor result for a target link, an average success rate of data transmission in the target link; or a retransmission time at the Radio Link Control (RLC) layer.

Step 102: determining whether a link exception exists in the target link or not according to the link state information.

In the step, it may be determined whether the link state information satisfies a pre-determined link deterioration condition or not. In a case that the link state information satisfies the pre-determined link deterioration condition, it may be determined that the link exception exists in the target link.

The link deterioration condition may be configured through a Radio Resource Control (RRC) signaling.

For example, for purpose of avoiding a false determination result of the link exception, in a case that a duration for which a quality monitor result for the target link does not meet a pre-determined link quality requirement reaches a first pre-determined value, or in a case that a duration for which an average success rate of the data transmission in the target link does not satisfy a pre-determined success rate reaches a second pre-determined value, it may be considered that the link exception exists in the target link. The first pre-determined value and the second pre-determined value may be values configured arbitrarily. Optionally, in a case that a condition that the secondary node cannot handle by itself happens, such as if a quantity of the retransmission times at the RLC layer exceeds a maximum value, it may be determined that the link exception exists in the target link.

Step 103: in a case that the link exception is determined to exist in the target link, transmitting link exception indication information to the primary node, wherein the link exception indication information is used to indicate to the primary node that the link exception exists in the target link.

In some embodiments of the present disclosure, the link exception indication information includes link quality deterioration indication information or data transmission state information. Optionally, in order to enable the primary node to process adaptively, the link exception indication information may also include both the link quality deterioration indication information and the data transmission state information. The link quality deterioration indication information is used to indicate to the primary node that the link exception exists in the target link, and the data transmission state information is used to indicate detailedly a data transmission condition of the target link to the primary node, so that the primary node may perform an adaptive processing.

In view of the above, under a condition the link exception exists in the target link in some embodiments of the present disclosure, the secondary node may transmit the link exception indication information to the primary node; the primary node selects an alternative link according to the information and processes data related to the target link. Through technical solutions in some embodiments of the present disclosure, under a condition that the link exception exists in the target link, data related to the target link may be processed through the alternative link in time, thereby ensuring a normal data transmission process.

Based on the example shown in FIG. 2, the information processing method may further include steps 104-106 as follow.

Step 104: under a condition that the link state information of the target link satisfies a predetermined link recovery condition, transmitting link quality recovery indication information to the primary node by the secondary node.

In a case that a condition of the target link related to the secondary node satisfies a pre-configured recovery condition, the secondary node transmits the link quality recovery indication information to the primary node so as to inform the primary node that the target link may be used for a normal transmission. The pre-configured recovery condition may be configured through a Radio Resource Control (RRC) signaling. For example, the pre-configured recovery condition may be a link quality monitor result of the target link satisfies a determined threshold. In order to avoid a false reporting result from being reported to the primary node, the target link may be determined to be recovered under a condition that the link quality monitor result for the target link satisfies a certain threshold and a condition of the satisfying is kept for a certain time duration or for certain times.

Step 105: stopping data transmission in the target link by the secondary node.

A sequence between the step 104 and the step 105 is not restricted.

In an actual application, after the secondary node reports the link exception indication information, the secondary node may directly stop the data transmission in the target link. Optionally, the primary node may transmit a state-report acknowledging message to the secondary node to acknowledge receipt of the link exception indication information. In such a case, the step 105 may also be performed after the secondary node receives the state-report acknowledging message transmitted by the primary node, i.e., the secondary node stops the data transmission in the target link according to the state-report acknowledging message.

Step 106: receiving, by the secondary node, a link recovery acknowledge message transmitted by the primary node.

In the above step, for sake of enhancing a resource utilization rate and after the secondary node stops the data transmission in the target link in step 105, the target link may also be reset and data transmission may be started in the reset target link. Optionally, subsequent to the step 106, the target link may also be reset by the secondary node and data transmission may be started in the reset target link. Optionally, subsequent to the step 106, the target link may also be reset by the secondary node after the secondary node receives the link recovery acknowledge message, and data transmission may be performed in the reset target link.

In some embodiments, the secondary node may stop the data transmission in the target link immediately after the secondary node has reported the link exception indication information, or the secondary node may stop the data transmission in the target link after the secondary node receives the state-report acknowledging message transmitted by the primary node.

Resetting the target link by the secondary node and performing the data transmission through the reset target link happen after the secondary node stops the data transmission in the target link. This operation may be performed after the data transmission in the target link is stopped by the secondary node, after the link quality recovery indication information is transmitted to the primary node by the secondary node, or after the secondary node stops the data transmission in the target link, transmits the link quality recovery indication information to the primary node and receives the link recovery acknowledge message transmitted by the primary node.

Figure 3:
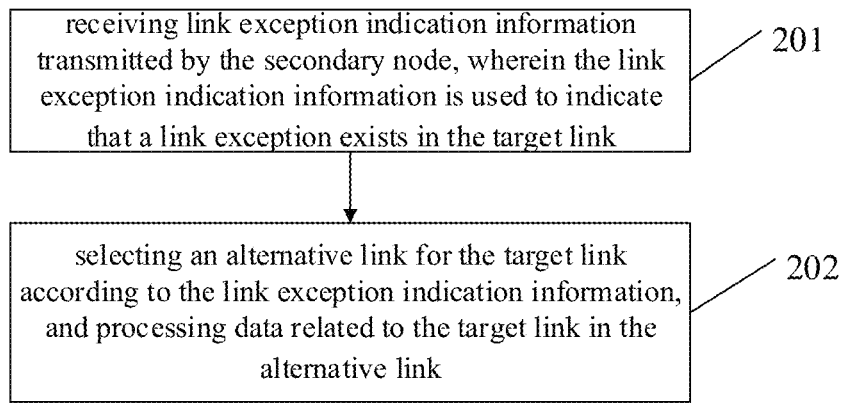
FIG. 3 is a flowchart of an information processing method in some embodiments of the present disclosure.

FIG. 3 is a flowchart of an information processing method in some embodiments of the present disclosure. The information processing method provided in the FIG. 3 is applied to the primary node. The primary node includes, but is not limited to, the MeNB or the CU. The information processing method includes steps 201-202.

Step 201: receiving link exception indication information transmitted by the secondary node, wherein the link exception indication information is used to indicate that a link exception exists in the target link.

The link exception indication information includes link quality deterioration indication information, or the link exception indication information includes both the link quality deterioration indication information and the data transmission state information.

Step 202: selecting an alternative link for the target link according to the link exception indication information, and processing data related to the target link in the alternative link.

Criteria for selecting the alternative link by different types of primary nodes are different. For example, under a condition that the MeNB has a transmission link belonging to the MeNB and if a SeNB reports a link exception of a link, the MeNB may orchestrate data related to the link to be transmitted or re-transmitted in the transmission link, or may orchestrate the data to be transmitted or re-transmitted in another link belonging to another SeNB. In case that a CU is only a control node and does not necessarily have a real transmission link, if a link exception happens to a link belonging to a DU, the CU may only orchestrate a link related to another DU to perform transmission or re-transmission. Factors considered by the primary node for selecting the alternative link mainly include a link quality, a cache capability, a load amount, and so on of the alternative link. In a case that multiple links may be selected as the alternative link, one of the multiple links having a superior link quality, a small load amount and a strong cache capability may be selected as the alternative link.

In view of the above, under a condition the link exception exists in the target link in some embodiments of the present disclosure, the secondary node may transmit the link exception indication information to the primary node; the primary node selects an alternative link according to the information and processes data related to the target link. Through technical solutions in some embodiments of the present disclosure, under a condition that the link exception exists in the target link, data related to the target link may be processed through the alternative link in time, thereby ensuring a normal data transmission process.

Technical solutions of the embodiments of the present disclosure may be applied to multiple communication architectures, such as a dual-connectivity/multiple-connectivity bearer separation architecture, a CU-DU PDCP-RLC split architecture, a CU-DU Higher RLC-Lower RLC split architecture, and so on. A process of the information processing method of the embodiments of the present disclosure is described hereinafter in combination with different examples in detail.

Figure 4:
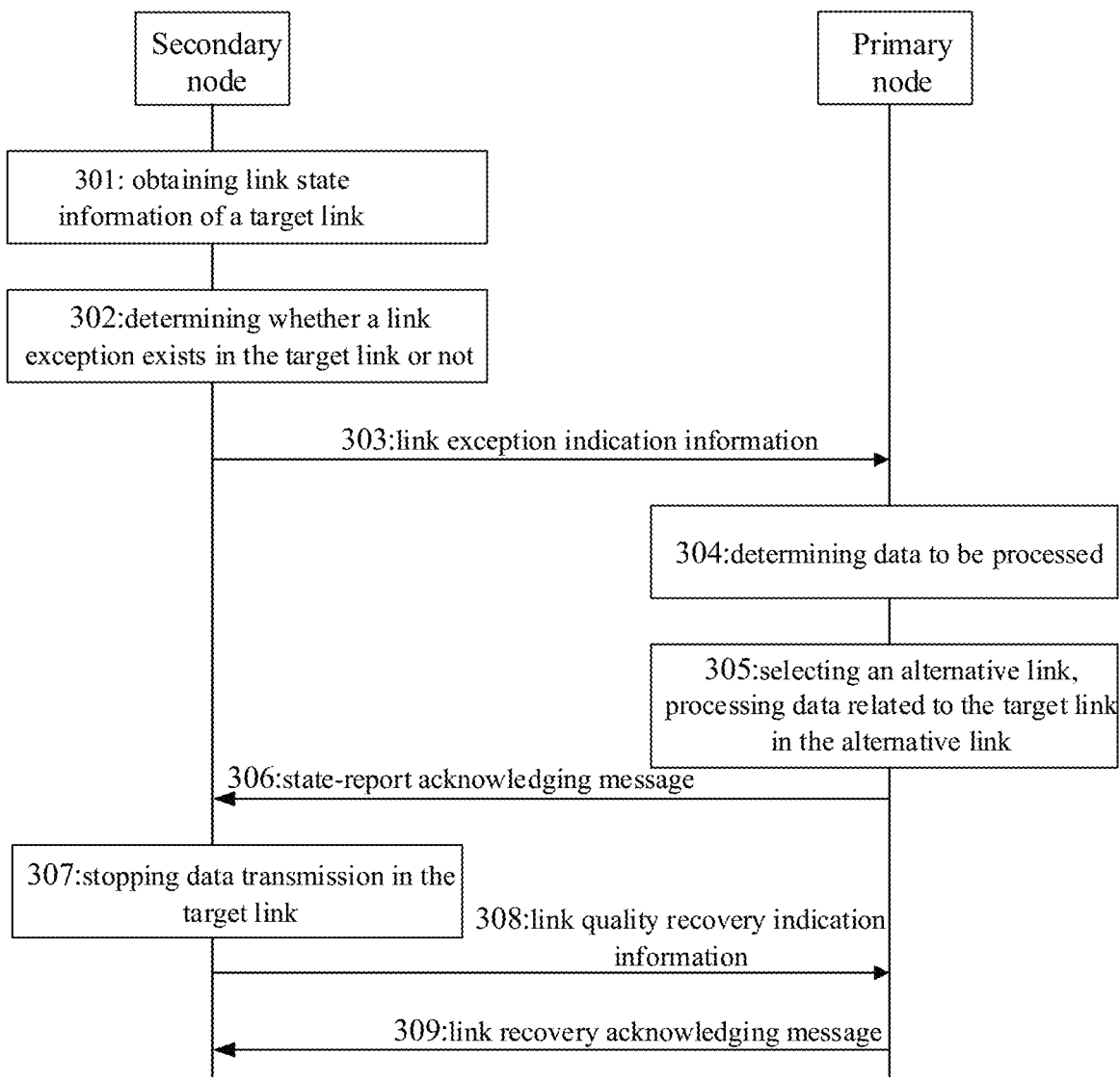
FIG. 4 is a flowchart of an information processing method in some embodiments of the present disclosure.

FIG. 4 is a flowchart of an information processing method in some embodiments of the present disclosure. In the example shown in FIG. 4, a description is made in an application scene of the dual-connectivity/multiple-connectivity bearer separation architecture. In a dual-connectivity 3C architecture similar to that in a Long Term Evolution (LTE), a radio bearer is split to be transmitted in two or more links. In such a case, a PDCP layer is located at the MeNB (the primary node) as a centralized processing protocol layer, and the RLC layer and protocol layers below the RLC layer are distributed at the SeNBs (the secondary nodes) and are used for different processings of data packets. Downlink data in a same logical channel is processed in the PDCP layer in the MeNB firstly, and thereafter is assigned to different SeNBs for transmission along paths of the SeNBs.

Interfaces are established between the MeNB and the SeNBs participating the transmission of the data and are used to transmit data and state information. Contents of data packets being transmitted are PDCP PDUs (Protocol Data Units).

The information processing method shown in FIG. 4 may include steps 301 to 309.

Step 301: monitoring links related to the secondary node by the secondary node and obtaining link state information of a target link.

Step 302: determining whether a link exception exists in the target link or not according to the link state information by the secondary node.

Detailed descriptions of the steps 301 and 302 may be obtained by referring to the descriptions of the steps 101 and 102 shown in the embodiments shown in FIG. 1.

Step 303: in a case that the link exception is determined to exist in the target link, transmitting link exception indication information to the primary node by the secondary node.

Accordingly, the primary node receives the link exception indication information transmitted by the secondary node. The link exception indication information is used to indicate to the primary node that the link exception exists in the target link. In some embodiments of the present disclosure, the link exception indication information includes link quality deterioration indication information and/or data transmission state information. The two information may be transmitted to the primary node concurrently or may be transmitted to the primary node separately.

In some embodiments of the present disclosure, the data transmission state information may have different forms.

(1) First Form

The data transmission state information includes sequence numbers of contents in a first type of data packets, sequence numbers of contents in a second type of data packets, and sequence numbers of contents in a third type of data packets.

The contents in the first type of data packets include: PDCP PDUs (Protocol Data Units) having been transmitted through an air-interface and been acknowledged by a correspondence end; the contents in the second type of data packets include: PDCP PDUs having been transmitted through the air-interface but not being acknowledged by the correspondence end; the contents in the third type of data packets include: PDCP PDUs not being transmitted through the air-interface.

That is, in such a form, feedback is performed directed to sequence numbers (SNs) corresponding to the above three transmission states or transmission types of the PDCP PDUs, i.e., three different lists including SNs corresponding to the PDCP PDU in the above three states, respectively are provided.

After the primary node receives the data transmission state information in this form, the primary node may take the contents in the second type of data packets and the contents in the third type of data packets as data to be processed. Contents in the second type of data packets need to be re-transmitted, and the contents in the third type of data packets need to be transmitted.

(2) Second Form

The data transmission state information includes a maximum sequence number corresponding to contents in the first type of data packets, and a maximum sequence number corresponding to contents in the second type of data packets.

The maximum sequence number corresponding to contents in the first type of data packets is smaller than or equal to the maximum sequence number corresponding to contents in the second type of data packets. The contents in the first type of data packets include: PDCP PDUs having been transmitted through the air-interface continuously and been acknowledged by a correspondence end; the contents in the second type of data packets include: PDCP PDUs having been transmitted through the air-interface but not being acknowledged by the correspondence end.

Figure 5:
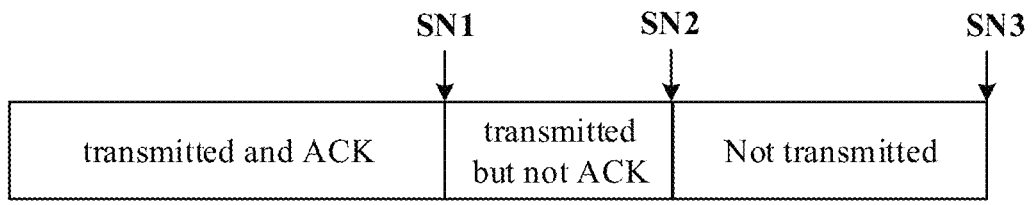
FIG. 5 and FIG. 6 are schematic diagrams of information about a data transmission status in some embodiments of the present disclosure.

That is to say, in this form, as shown in FIG. 5, the secondary node reports a maximum sequence number SN1 corresponding to a PDCP PDU having been transmitted through the air-interface and having been acknowledged by the correspondence end, and a maximum sequence number SN2 corresponding to a PDCP PDU having been transmitted through the air-interface but not being acknowledged by the correspondence end.

Generally, SN1 is smaller than or equal to SN2, and both the SN1 and the SN2 are smaller than or equal to a maximum sequence number SN3 corresponding to contents of data assigned to the secondary node by the primary node, i.e., SN3≥SN2≥SN1. A value of the SN3 may be transmitted to the primary node by the secondary node.

After the primary node receives data transmission information of this form, all PDCP PDUs having sequence numbers smaller than the SN1 may be considered by the primary node to have been transmitted through the air-interface and have been acknowledged by the correspondence end, and thus the PDCU PDUs do not need to be transmitted again.

PDCP PDUs having sequence numbers between the SN1 and the SN2 are in a state of being received out of order, i.e. one or more PDCP PDUs of the PDCP PDUs having sequence numbers between the SN1 and the SN2 might be received correctly. However, since the one or more PDCP PDUs are discontinuous, the PDCP PDUs having the sequence numbers between the SN1 and the SN2 may only be entirely considered as having been transmitted through the air-interface but not being acknowledged by the correspondence end. The primary node needs to re-transmit the PDCP PDUs. The secondary node may also identify PDCP PDUs, having been transmitted through the air-interface and being acknowledged by the correspondence end, of the PDCP PDUs having sequence numbers between the SN1 and the SN2. The PDCP PDUs, having been transmitted through the air-interface and being acknowledged by the correspondence end, of the PDCP PDUs having sequence numbers between the SN1 and the SN2, are considered as contents in a fourth type of data packets. Thereafter, the data transmission state information further includes sequence numbers of the contents in the fourth type of data packets. In such a case, if the primary node receives sequence numbers of the contents in the fourth type of data packets, the contents in the fourth type of data packets need not to be re-transmitted.

PDCP PDUs having sequence numbers larger than SN2 are PDCP PDUs having been transmitted to the secondary node, but are not transmitted through the air-interface. Thus, the primary node needs to transmit the PDCP PDUs.

(3) Third Form

The data transmission state information includes a maximum sequence number corresponding to contents in a fifth type of data packets, and the maximum sequence number corresponding to contents in the second type of data packets.

Contents in the fifth type of data packets includes PDCP PDUs having been transmitted through the air-interface (including PDCP PDUs having been transmitted through the air-interface and having been acknowledged by the correspondence end, and PDCP PDUs having been transmitted through the air-interface and not being acknowledged by the correspondence end). A part of the fifth type of data packets may be selected to form the second type of data packets, and the part of the fifth type of data packets includes PDCP PDUs having been transmitted through the air-interface but not being acknowledged by the correspondence end, the sequence numbers of the contents in the second type of data packet are smaller than the maximum sequence number corresponding to the contents in the fifth type of data packets.

That is to say, in this form, the secondary node reports to the primary node the maximum sequence number corresponding to a PDCP PDU having been transmitted through the air-interface and a sequence number corresponding to a PDCP PDU having been transmitted through the air-interface but not being acknowledged by the correspondence end.

Figure 6:
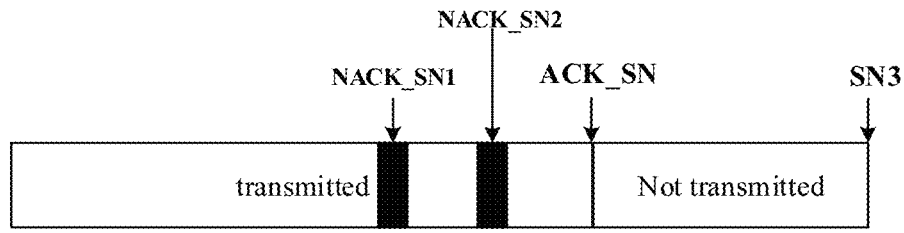

As shown in FIG. 6, an ACK_SN is a maximum sequence number SN of a PDCP PDU having been transmitted through the air-interface. For PDCP PDUs having sequence numbers smaller than the ACK_SN and having not been acknowledged by the correspondence end, the sequence numbers are listed in a NACK_SN list. That is, the data transmission state information transmitted from the secondary node to the primary node includes two information, i.e., the ACK_SN and the NACK_SN list.

If the primary node receives the data transmission state information, the primary node understands PDCP PDUs, other than contents of data packets listed in the NACK_SN list, of all PDUs having sequence numbers smaller than the ACK_SN are all successfully transmitted and need not to be retransmitted; and the PDCP PDUs in the NACK_SN list need to be transmitted through other paths; PDCP PDUs having sequence numbers larger than the ACK_SN, of contents of all PDCP PDUs assigned to the secondary node by the primary node, are understood to not be transmitted and also need to be transmitted through other paths.

Generally, the data transmission state information in the above three forms is generally adapted to an Acknowledge Mode (AM), and an ACK feedback also refers to an explicit acknowledge carried in a status report at the RLC layer. In an Un-acknowledge Mode (UM), only information about which data packets are transmitted and information about which data packets are not transmitted may be fed back, i.e. a fourth form below.

(4) Fourth Form

The data transmission state information includes sequence numbers of contents in data packets having been transmitted through the air-interface, and/or sequence numbers of contents in data packets having not been transmitted through the air-interface.

In such a case, the primary node may determine PDCP PDUs having not been transmitted through the air-interface, according to the data transmission state information and information about contents of the data packets assigned to the secondary node, and may transmit the PDCP PDUs having not been transmitted through the air-interface.

It should be noted that, a sequence number (SN) in the present disclosure may be a sequence number of a PDCP PDU, or a sequence number corresponding to interface transmission protocols, such as a SN in a User Plane of GRPS Tunneling Protocol (GTP-U). A type of SN to be used is pre-negotiated between the primary node and the secondary node.

Step 304: determining, by the primary node according to the data transmission state information, data to be processed.

The data to be processed includes contents of data packets needing to be re-transmitted, and contents of data packets needing to be transmitted. The contents of data packets needing to be re-transmitted refer to contents of data packets having been transmitted by the secondary node through the air-interface but not being acknowledged by the correspondence end. The contents of data packets needing to be transmitted refer to contents of data packets not being transmitted through the air-interface.

Step 305: selecting an alternative link for the target link according to the link exception indication information by the primary node, and processing data related to the target link in the alternative link.

In this example, under a condition that the primary node has a transmission link belonging to the primary node and if a secondary node reports a link exception of a link, the primary node may orchestrate data related to the link to be transmitted or re-transmitted in the transmission link, or may orchestrate the data to be transmitted or re-transmitted in another link belonging to another secondary node.

In the first form, after the primary node receives the data transmission state information in this form, the primary node may take the contents in the second type of data packets and the contents in the third type of data packets as data to be processed. Contents in the second type of data packets need to be re-transmitted, and the contents in the third type of data packets need to be transmitted.

In the second form, the primary node takes PDCP PDUs having sequence numbers between the SN1 and the SN2 as the contents of data packets needing to be re-transmitted, and takes PDCP PDUs having sequence numbers larger than the SN2 as the contents of data packets needing to be transmitted. If the data transmission state information further includes sequence numbers of contents in the fourth type of data packets, contents of data packets needing to be re-transmitted are contents of data packets other than the fourth type of data packets.

In the third form, the primary node takes the PDCP PDUs in the NACK_SN list as the contents of data packets needing to be re-transmitted; and PDCP PDUs having sequence numbers larger than the ACK_SN, in contents of all data packets assigned to the secondary node by the primary node, are taken as the contents of data packets needing to be transmitted.

In the above fourth form, the primary node takes the contents of data packets not being transmitted through the air-interface as the contents of data packets needing to be transmitted.

Step 306: transmitting a state-report acknowledging message to the secondary node by the primary node.

Step 307: stopping data transmission in the target link by the secondary node according to the state-report acknowledging message.

Step 308: under a condition that the link state information of the target link satisfies a predetermined link recovery condition, transmitting link quality recovery indication information to the primary node by the secondary node.

In a case that a condition of the target link related to the secondary node satisfies a pre-configured recovery condition, the secondary node transmits the link quality recovery indication information to the primary node so as to inform the primary node that the target link may be used for a normal transmission. The pre-configured recovery condition may be configured through a RRC signaling. For example, the pre-configured recovery condition may be a link quality monitor result of the target link satisfies a determined threshold. In order to avoid a false report from being performed, the target link may be determined to be recovered under a condition that the link quality monitor result for the target link satisfies a certain threshold and a condition of the satisfying is kept for a certain time duration or for certain times.

Accordingly, the primary node receives the link quality recovery indication information transmitted by the secondary node.

Step 309: transmitting a link recovery acknowledging message to the secondary node by the primary node.

Thereafter, the primary node recovers data transmission in the target link.

In the embodiments of the present disclosure, after the secondary node reports the link exception indication information, the secondary node may reset the target link. The resetting may be performed after the step 307. That is, at the time of stopping data transmission or after the data transmission is stopped. The resetting may optionally be performed after the step 309. The secondary node resets related state information. For example, all states in RLC/MAC/PHY are reset, i.e., the target link is reset, and the reset target link is used for data transmission. That is, data transmission is started from an initial condition of the target link.

In the above procedure, if a link state of the target link satisfies another reporting condition according to a monitoring result of the target link, the link exception indication information is transmitted to the primary node once more. For example, when a condition of the target link is further deteriorated or the condition of the target link being deteriorated exceeds a certain condition but the target link is not recovered, the secondary node may report to the primary node again, and then the primary node may delete the link. Optionally, the primary node may determine by itself, whether the link condition of the target link is further deteriorated or not or the link condition of the target link being deteriorated exceeds the certain condition but the target link is not recovered, the link may be cancelled by the primary node.

In view of the above, under a condition that the link exception exists in the target link in some embodiments of the present disclosure, the secondary node may transmit the link exception indication information to the primary node; the primary node selects an alternative link according to the information and processes data related to the target link. Through technical solutions in some embodiments of the present disclosure, under a condition that the link exception exists in the target link, data related to the target link may be processed through the alternative link in time, thereby ensuring a normal data transmission process.

Some other embodiments of the present disclosure are applied to a CU-DU architecture, and a separation between protocol stacks of the CU and the DU uses an architecture in which the PDCP layer and the RLC layer are separated (PDCP-RLC separation). That is, the PDCP layer is located in a CU entity as a centralized protocol stack, and the RLC layer and protocols stacks below the RLC layer are located in DU entities.

In this architecture, an interface exists between the CU entity and the DU entity, and is used for transmitting user data and interaction information. The CU entity performs a centralized control function, and is a centralized anchor node for data. Data of the UE needs to be transmitted to or received from the Core Network (CN) and external networks through the CU entity. As to a single UE, the UE may establish connections with a plurality of DU entities and transmit data through the DU entities and the data will finally be converged to the CU entity. In this architecture, contents of data transferred through the interface between the CU entity and the DU entity are also PDCP PDUs and may also follow a transmission protocol, for example, the GPRS Tunnelling Protocol-U or the Generic Routing Encapsulation, or the like.

In the embodiments of the present disclosure, link deterioration may occur in a single transmission link for a DU entity. For example, in a case that transmissions on a link are shielded or broken for many times and normal transmissions on a link related a certain DU entity may not be performed within a certain time interval, a condition of this abnormal transmission needs to be reported to the CU entity so as to ensure that data of the UE may be transmitted continuously and user experiences may not be interrupted temporarily. After a period of time, the link may be recovered, and the CU entity recovers data transmission at the DU entity, or the CU entity determines that the DU entity is not qualified to serve the UE any more, and thus the link is deleted accordingly.

In the embodiments of the present disclosure, an interaction between the CU entity and the DU entity is similar to that between the primary node and the secondary node in the embodiments shown in FIG. 4. In some embodiments, the primary node is the CU entity, and the secondary node is the DU entity.

Difference between that in FIG. 4 and this embodiment is a manner in which the CU entity selects an alternative link. For example, under a condition that the primary node has a transmission link belonging to the primary node and if a secondary node reports a link exception of a link, the primary node may orchestrate data related to the link to be transmitted or re-transmitted in the transmission link, or may orchestrate the data to be transmitted or re-transmitted in another link related to to another secondary node. Since the CU entity is only a control node, the CU entity does not necessarily have a real transmission link. If a link exception happens to a link related to a DU entity, the CU entity may only orchestrate a link belonging to another DU entity to perform transmission or re-transmission. Additionally, since a control relation exists between the CU entity and the DU entity, the CU entity may more clearly know link conditions at the DU entities, and an optimum link may be selected by the CU entity for transmission and re-transmission.

In view of the above, under a condition the link exception exists in the target link in some embodiments of the present disclosure, the secondary node may transmit the link exception indication information to the primary node; the primary node selects an alternative link according to the information and processes data related to the target link. Through technical solutions in some embodiments of the present disclosure, under a condition that the link exception exists in the target link, data related to the target link may be processed through the alternative link in time, thereby ensuring a normal data transmission process.

In another embodiment of the present application, a processing manner for the CU-DU architecture is provided. That is, a protocol-stack separation between the CU entity and the DU entity uses an architecture in which a Higher RLC layer and a Lower RLC layer are separated, i.e., the PDCP layer and the Higher RLC are located at the CU entity as a centralized protocol stack, and the Lower RLC layer and layers below the RLC layer are located at the DU entities. In the Higher RLC layer, a one-to-one mapping between RLC PDUs and PDCP PDUs is performed and is assigned a RLC SN. In the Lower RLC, RLC PDUs having suitable sizes are segmented and transmitted to the MAC layer sequentially for encapsulation and transmission according to sizes of transmission resources provided by the MAC layer in real-time.

In such an architecture, contents of data packets transmitted through the interface between the CU entity and the DU entity are RLC PDUs including RLC SNs. The interface may also be provided with a transport layer protocol, such as the GTP-U or GRE.

In the embodiments of the present disclosure, an interaction between the CU entity and the DU entity is similar to that between the primary node and the secondary node in the embodiments shown in FIG. 4. In some embodiments, the primary node is the CU entity, and the secondary node is the DU entity. In such an architecture, since an Automatic Repeat reQuest (ARQ) function in the RLC layer is mainly located at the CU entity, the DU entity cannot perform an accurate ACK (acknowledge) to data packets, and may only determine whether a transmission is successful or not according to a feedback from HARQ. If a state of the ACK is determined by determining whether a maximum transmission of the HARQ is successful or not, forms of data transmission state information in this embodiment are the same as the four forms in the embodiment shown in FIG. 4. However, in the embodiment of the present disclosure, the contents of the data packets are RLC PDUs.

Based on the four forms of the data transmission state information in the embodiment shown in FIG. 4, in some embodiments, another form of the data transmission state information may further be added. The data transmission state information includes a maximum sequence number of contents of data packets having been transmitted through the air-interface, and the contents of data packets having been transmitted through the air-interface include RLC PDUs having been transmitted through the air-interface. The SNs may be RLC SNs, or PDCP SNs, or SNs of data packets transmitted through the GTP-U or a GRE protocol at a network layer.

In view of the above, under a condition the link exception exists in the target link in some embodiments of the present disclosure, the secondary node may transmit the link exception indication information to the primary node; the primary node selects an alternative link according to the information and processes data related to the target link. Through technical solutions in some embodiments of the present disclosure, under a condition that the link exception exists in the target link, data related to the target link may be processed through the alternative link in time, thereby ensuring a normal data transmission process.

Figure 7:
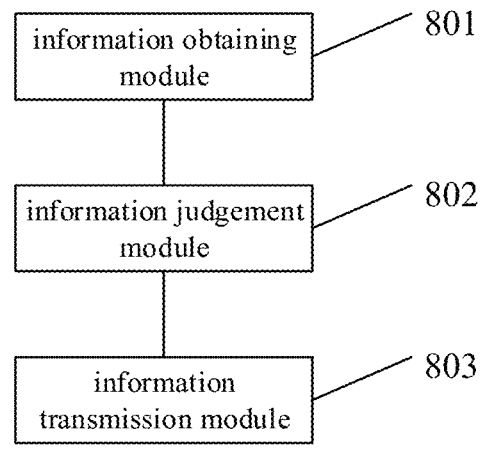
FIG. 7 is a schematic diagram of an information processing device in some embodiments of the present disclosure.

FIG. 7 is a schematic diagram of an information processing device in some embodiments of the present disclosure. The information processing device shown in FIG. 7 includes an information obtaining module 801, an information judgement module 802, and an information transmission module 803.

The information obtaining module 801 is configured for obtaining link state information of a target link. The information judgement module 802 is configured for determining whether a link exception exists in the target link or not according to the link state information. The information transmission module 803 is configured for, in a case that the link exception is determined to exist in the target link, transmitting link exception indication information to the primary node, wherein the link exception indication information is used to indicate to the primary node that the link exception exists in the target link.

The information judgement module 802 includes a judging submodule and a determination submodule. The judging submodule is configured for judging whether the link state information satisfies a pre-determined link deterioration condition or not. The determination submodule is configured for, in a case that the link state information satisfies the pre-determined link deterioration condition, determining that the link exception exists in the target link.

As mentioned above, the link exception indication information includes link quality deterioration indication information and/or data transmission state information.

In some embodiments of the present disclosure, the data transmission state information may have different forms. Specific details of the forms may be obtained by referring to the above process embodiments.

The information transmission module 803 is further configured for, under a condition that the link state information of the target link satisfies a predetermined link recovery condition, transmitting link quality recovery indication information to the primary node.

Figure 8:
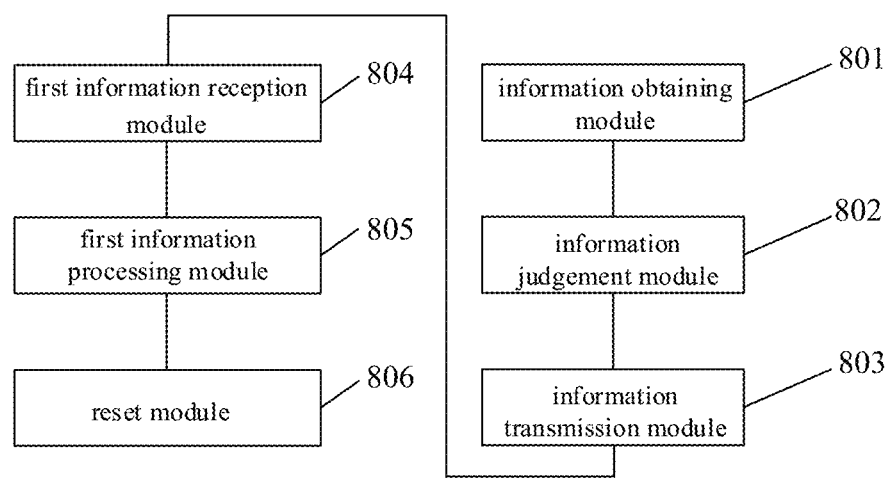
FIG. 8 is a schematic diagram of an information processing device in some embodiments of the present disclosure.

As shown in FIG. 8, the device further includes a first information processing module 805 configured for stopping data transmission in the target link. As shown in FIG. 8, the device further includes a first information reception module 804 configured for receiving state-report acknowledging message transmitted by the primary node. In such a case, the first information processing module 805 is specifically configured for, stopping data transmission in the target link according to the state-report acknowledging message. For sake of utilizing links sufficiently, the device further includes a reset module 806 configured for resetting the target link and performing data transmission by means of the reset target link.

Figure 9:
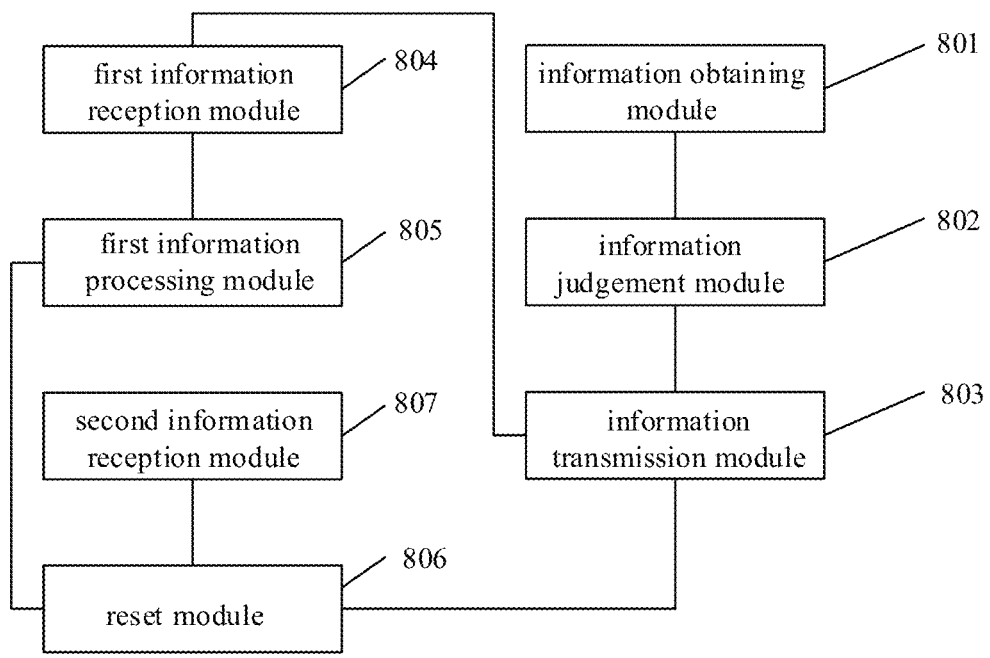
FIG. 9 is a schematic diagram of an information processing device in some embodiments of the present disclosure.

As shown in FIG. 9, the device further includes a second information reception module 807 configured for receiving a link recovery acknowledging message transmitted by the primary node. The reset module 806 is further configured for resetting the target link according to the link recovery acknowledging message and transmit data by means of the reset target link.

An operational principle of the device in the present disclosure may be obtained by referring to the process embodiments of the present disclosure, and may be in the primary node or in the CU entity.

In view of the above, under a condition the link exception exists in the target link in some embodiments of the present disclosure, the secondary node may transmit the link exception indication information to the primary node; the primary node selects an alternative link according to the information and processes data related to the target link. Through technical solutions in some embodiments of the present disclosure, under a condition that the link exception exists in the target link, data related to the target link may be processed through the alternative link in time, thereby ensuring a normal data transmission process.

Figure 10:
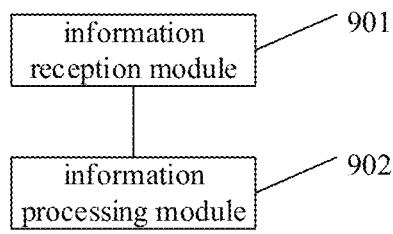
FIG. 10 is a schematic diagram of an information processing device in some embodiments of the present disclosure.

FIG. 10 is a schematic diagram of an information processing device in some embodiments of the present disclosure. The information processing device shown in FIG. 10 includes an information reception module 901 and an information processing module 902.

The information reception module 901 is configured for receiving link exception indication information transmitted by the secondary node, the link exception indication information is used to indicate that a link exception exists in the target link. The information processing module 902 is configured for selecting an alternative link for the target link according to the link exception indication information, and processing data related to the target link in the alternative link.

The link exception indication information includes link quality deterioration indication information and/or data transmission state information.

Figure 11:
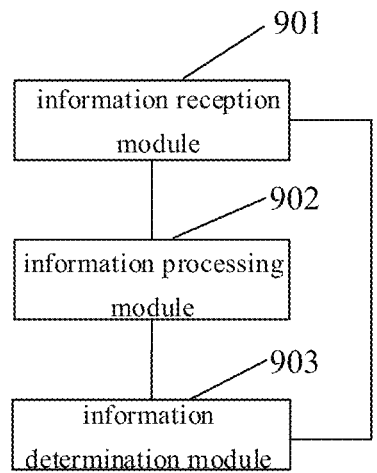
FIG. 11 is a schematic diagram of an information processing device in some embodiments of the present disclosure.

FIG. 11 is another schematic diagram of an information processing device in some embodiments of the present disclosure. As shown in FIG. 11, in a case that the link exception indication information includes the data transmission state information, the device further includes an information determination module 903 configured for determining data to be processed according to the data transmission state information. The information processing module 902 is specifically configured for selecting an alternative link for the target link according to the link exception indication information, and processing the data in the alternative link.

In the first form of the data transmission state information, the information determination module 903 is specifically configured for taking the contents in the second type of data packets and the contents in the third type of data packets as the data to be processed, according to the sequence numbers of the contents in the second type of data packets and the sequence numbers of the contents in the third type of data packets. The information processing module 902 is specifically configured for re-transmitting the contents in the second type of data packets in the alternative link, and transmitting the contents in the third type of data packets in the alternative link.

In the second form of the data transmission state information, the information determination module 903 is specifically configured for determining contents of data packets needing to be re-transmitted and contents of data packets needing to be transmitted in contents of all data packets assigned to the secondary node, according to a maximum sequence number corresponding to the contents in the first type of data packets and a maximum sequence number corresponding to contents in the second type of data packets, wherein sequence numbers of contents of data packets needing to be re-transmitted are larger than the maximum sequence number corresponding to the contents in the first type of data packets and smaller than the maximum sequence number corresponding to contents in the second type of data packets; the sequence numbers of contents of data packets needing to be transmitted are larger than the maximum sequence number corresponding to the contents in the second type of data packets. The information processing module 902 is specifically configured for re-transmitting the contents of data packets needing to be re-transmitted in the alternative link, and transmitting the contents of data packets needing to be transmitted in the alternative link.

In such a form, the data transmission state information further includes a maximum sequence number corresponding to contents of data packets assigned to the secondary node and/or sequence numbers of contents in a fourth type of data packets. The sequence numbers of contents of data packets needing to be transmitted are smaller than the maximum sequence number corresponding to contents of data packets assigned to the secondary node. The sequence numbers of the contents in the fourth type of data packets are larger than the maximum sequence number corresponding to the contents in the first type of data packets and smaller than the maximum sequence number corresponding to the contents in the second type of data packets; and the contents in the fourth type of data packets include PDCP PDUs or RLC PDUs having been transmitted through the air-interface and being acknowledged (ACK) by the correspondence end; the contents of the data packets needing to be re-transmitted are contents of data packets other than the fourth type of data packets.

In the third form of the data transmission state information, the information determination module 903 is specifically configured for, according to the maximum sequence number corresponding to the contents in the fifth type of data packets and sequence numbers of the contents in the second type of data packets, determining contents of data packets needing to be re-transmitted and contents of data packets needing to be transmitted. The information processing module 902 is specifically configured for re-transmitting the contents of the data packets needing to be re-transmitted in the alternative link, and transmitting the contents of the data packets needing to be transmitted in the alternative link.

In the fourth form of the data transmission state information, the information determination module 903 is specifically configured for taking contents of data packets having not been transmitted through the air-interface as data to be processed, according sequence numbers of contents of data packets having been transmitted through the air-interface and/or sequence numbers of contents of data packets having not been transmitted through the air-interface.

Corresponding to the data transmission state information in the embodiment in which a protocol-stack separation between the CU entity and the DU entity uses an architecture in which the Higher RLC layer and the Lower RLC layer are separated, the data transmission state information includes a maximum sequence number corresponding to contents of data packets having been transmitted through the air-interface, and the contents of data packets having been transmitted through the air-interface include RLC PDUs having been transmitted through the air-interface. In such a case, the information determination module 903 is specifically used for taking, as data to be processed, contents of data packets having sequence numbers larger than the maximum sequence number corresponding to the contents of the data packets having been transmitted through the air-interface in contents of all data packets assigned to the secondary node.

Additionally, the information reception module 901 is further configured for receiving link quality recovery indication information transmitted by the secondary node.

Figure 12:
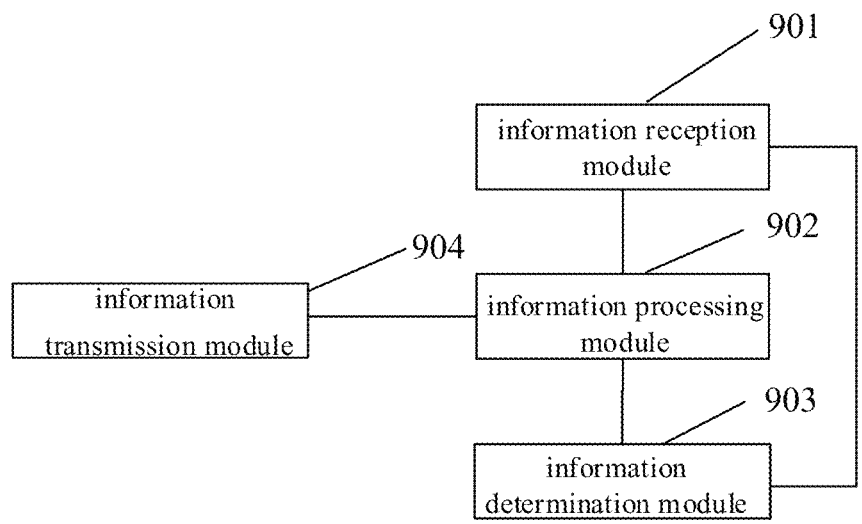
FIG. 12 is a schematic diagram of an information processing device in some embodiments of the present disclosure.
Figure 13:
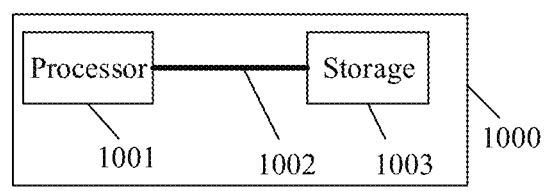
FIG. 13 is a schematic diagram of an information processing device in some embodiments of the present disclosure.
Figure 14:
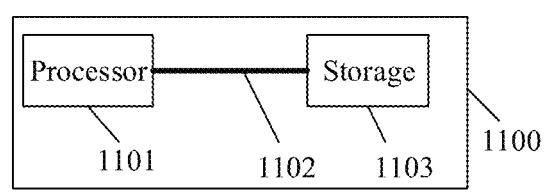
FIG. 14 is a schematic diagram of an information processing device in some embodiments of the present disclosure.

FIG. 12 is another schematic diagram of an information processing device in some embodiments of the present disclosure. As shown in FIG. 12, the information processing device further includes an information transmission module 904, configured for transmitting a state-report acknowledging message to the secondary node; and/or transmitting a link recovery acknowledging message to the secondary node.

An operational principle of the device in the present disclosure may be obtained by referring to the process embodiments of the present disclosure, and may be in the secondary node or in the DU entity.

In view of the above, under a condition the link exception exists in the target link in some embodiments of the present disclosure, the secondary node may transmit the link exception indication information to the primary node; the primary node selects an alternative link according to the information and processes data related to the target link. Through technical solutions in some embodiments of the present disclosure, under a condition that the link exception exists in the target link, data related to the target link may be processed through the alternative link in time, thereby ensuring a normal data transmission process.

Some embodiments of the present disclosure further provide an information processing device 1000. The information processing device 1000 includes a processor 1001; a storage 1003 connected to the processor 1001 through a bus interface 1002, wherein the storage 1003 is configured to store programs and data used by the processor 1001 when the processor 1001 executes an operation. When the processor 1001 invokes and executes programs and data stored in the storage 1003, the processor 1001 implements functions of an information obtaining module, an information judgement module, and an information transmission module; the information obtaining module is configured for acquiring link state information of a target link; the information judgement module is configured for determining whether link exception exists in the target link or not according to the link state information; the information transmission module is configured for, in a case that the link exception is determined to exist in the target link, transmitting link exception indication information to the primary node, wherein the link exception indication information is used to indicate to the primary node that the link exception exists in the target link.

Some embodiments of the present disclosure further provide an information processing device 1100. The information processing device 1100 includes a processor 1101; a storage 1103 connected to the processor 1101 through a bus interface 1102, wherein the storage 1103 is configured to store programs and data used by the processor 1101 when the processor 1001 executes an operation. When the processor 1101 invokes and executes programs and data stored in the storage 1103, the processor 1001 implements functions of an information reception module and an information processing module. The information reception module is configured for receiving link-exception indication information transmitted by a secondary node, the link-exception indication information is used for indicating that a link exception exists in a target link. The information processing module is configured for selecting an alternative link for the target link according to the link-exception indication information and processing data related to the target link in the alternative link.

Beneficial effects of the technical solutions of the present disclosure are as follow, under a condition the link exception exists in the target link in some embodiments of the present disclosure, the secondary node may transmit the link exception indication information to the primary node; the primary node selects an alternative link according to the information and processes data related to the target link. Through technical solutions in some embodiments of the present disclosure, under a condition that the link exception exists in the target link, data related to the target link may be processed through the alternative link in time, thereby ensuring a normal data transmission process.

It should be noted that, the device including the processor and the storage provided in the present disclosure is a device capable of implementing the information processing method provided in the process embodiments of the present disclosure, and thus all contents in the above information processing method provided in the process embodiments of the present disclosure are applicable to the device including the processor and the storage, and same or similar beneficial effects may be attained.

It should be understood that, in the several embodiments provided in the present disclosure, the disclosed device and method can be implemented in other ways. The apparatus embodiments described above are only illustrative. For example, a division of units may be only one logically functional division. There may be other divisions in actual implementations, e.g., multiple units and components can be combined or integrated in another system, or some features may be omitted or not executed. Additionally, couplings, or direct couplings, or communication connections between displayed or discussed components may be via some interfaces, and indirect couplings or communication connections between devices or units and may be electrical connections, mechanical connections or other forms of connections.

The functional units described in the embodiments of the present disclosure may be integrated in one processing unit or may be separated physically, or two or more of the units may be integrated in one unit. The above integrated units may be implemented by hardware, or a functional unit including hardware and software.

The above integrated units implemented by the functional unit including software may be stored in a computer readable storage medium. The functional units including software stored the medium may include instructions for causing a computing device (which may be a personal computer, a server, a network device or the like) to perform some or parts of the method of the embodiments of the present disclosure. The storage medium may include mediums capable of storing codes, such as a USB disk, a removable disk, a Read Only Memory (ROM), a Random Access Memory (RAM), a Magnetic Disk, a Compact Disk, or the like. The medium may be a volatile storage medium or a non-volatile storage medium.

The above described embodiments of the present disclosure are optional embodiments. It should be noted that numerous modifications and embellishments may be made by one of ordinary skills in the art without departing from the spirit of the present disclosure, and such modifications and embellishments also fall within the scope of the present disclosure.

What is claimed is:

1. An information processing method, comprising:
obtaining link state information of a target link;
determining whether a link exception exists in the target link or not according to the link state information; and
in a case that the link exception is determined to exist in the target link, transmitting link exception indication information to a primary node, wherein the link exception indication information is used to indicate to the primary node that the link exception exists in the target link,
the link exception indication information comprises at least one of link quality deterioration indication information or data transmission state information,
in a case that the link exception indication information comprises the data transmission state information, the data transmission state information comprises:
sequence numbers of contents in a first type of data packets, sequence numbers of contents in a second type of data packets, and sequence numbers of contents in a third type of data packets;
wherein, the contents in the first type of data packets comprise Packet Data Convergence Protocol (PDCP) Protocol Data Units (PDUs) having been transmitted through an air-interface and acknowledged by a correspondence end; the contents in the second type of data packets comprise PDCP PDUs having been transmitted through the air-interface but not being acknowledged by the correspondence end; the contents in the third type of data packets comprise PDCP PDUs not being transmitted through the air-interface; or
the contents in the first type of data packets comprise Radio Link Control (RLC) PDUs having been transmitted through the air-interface and acknowledged by the correspondence end; the contents in the second type of data packets comprise RLC PDUs having been transmitted through the air-interface but not being acknowledged by the correspondence end; the contents in the third type of data packets comprise RLC PDUs having not been transmitted through the air-interface;

or
in a case that the link exception indication information comprises the data transmission state information, the data transmission state information comprises a maximum sequence number corresponding to contents in a first type of data packets, and a maximum sequence number corresponding to contents in a second type of data packets;
the maximum sequence number corresponding to contents in the first type of data packets is smaller than or equal to the maximum sequence number corresponding to contents in the second type of data packets,
wherein the contents in the first type of data packets comprise: Packet Data Convergence Protocol (PDCP) Protocol Data Units (PDUs) having been transmitted through the air-interface continuously and acknowledged by a correspondence end; the contents in the second type of data packets comprise: PDCP PDUs having been transmitted through the air-interface; or
the contents in the first type of data packets comprise: Radio Link Control (RLC) PDUs having been transmitted through the air-interface continuously and acknowledged by the correspondence end; the contents in the second type of data packets comprise RLC PDUs having been transmitted through the air-interface;

or
in a case that the link exception indication information comprises the data transmission state information, the data transmission state information comprises a maximum sequence number corresponding to contents in a fifth type of data packets, and sequence numbers of contents in a second type of data packets; the sequence numbers of contents in the second type of data packets are smaller than the maximum sequence number corresponding to the contents in the fifth type of data packets;
the contents in the fifth type of data packets comprise Packet Data Convergence Protocol (PDCP) Protocol Data Units (PDUs) having been transmitted through an air-interface, and the contents in the second type of data packets comprise PDCP PDUs having been transmitted through the air-interface but not being acknowledged (ACK) by a correspondence end; or
the contents in the fifth type of data packets comprise Radio Link Control (RLC) PDUs having been transmitted through the air-interface; the contents in the second type of data packets comprise RLC PDUs having been transmitted through the air-interface but not being acknowledged by the correspondence end;

or
in a case that the link exception indication information comprises the data transmission state information, the data transmission state information comprises sequence numbers of contents of data packets having been transmitted through an air-interface and/or sequence numbers of contents of data packets not being transmitted through the air-interface;
the contents of data packets having been transmitted through the air-interface comprise Packet Data Convergence Protocol (PDCP) Protocol Data Units (PDUs) having been transmitted through the air-interface; the contents of data packets not being transmitted through the air-interface comprise PDCP PDUs not being transmitted through the air-interface; or
the contents of data packets having been transmitted through the air-interface comprise Radio Link Control (RLC) PDUs having been transmitted through the air-interface; the contents of data packets not being transmitted through the air-interface comprise RLC PDUs not being transmitted through the air-interface;

or
in a case that the link exception indication information comprises the data transmission state information, the data transmission state information comprises a maximum sequence number corresponding to contents of data packets having been transmitted through an air-interface, and the contents of data packets having been transmitted through the air-interface comprise Radio Link Control (RLC) Protocol Data Units (PDUs) having been transmitted through the air-interface.

2. The method according to claim 1, wherein, the determining whether the link exception exists in the target link or not according to the link state information, comprising:
judging whether the link state information satisfies a pre-determined link deterioration condition or not; and
in a case that the link state information satisfies the pre-determined link deterioration condition, determining that the link exception exists in the target link.

3. The method according to claim 1, wherein, after the transmitting the link exception indication information to the primary node, the method further comprises:
under a condition that the link state information of the target link satisfies a predetermined link recovery condition, transmitting link quality recovery indication information to the primary node.

4. An information processing method, comprising:
receiving link exception indication information transmitted by a secondary node, wherein the link exception indication information is used to indicate that a link exception exists in a target link; and
selecting an alternative link for the target link according to the link exception indication information, and processing data related to the target link in the alternative link,
the link exception indication information comprises at least one of link quality deterioration indication information or data transmission state information,
in a case that the link exception indication information comprises the data transmission state information, after the receiving link exception indication information transmitted by the secondary node, the method further comprises determining, according to the data transmission state information, data to be processed;
the processing data related to the target link in the alternative link, comprises processing the data to be processed in the alternative link,
wherein,
the data transmission state information comprises: sequence numbers of contents in a first type of data packets, sequence numbers of contents in a second type of data packets, and sequence numbers of contents in a third type of data packets;
the determining, according to the data transmission state information, data to be processed, comprises:
taking the contents in the second type of data packets and the contents in the third type of data packets as the data to be processed, according to the sequence numbers of the contents in the second type of data packets and the sequence numbers of the contents in the third type of data packets;
the processing data related to the target link in the alternative link, comprises:
re-transmitting the contents in the second type of data packets in the alternative link, and transmitting the contents in the third type of data packets in the alternative link;
wherein, the contents in the first type of data packets comprise Packet Data Convergence Protocol (PDCP) Protocol Data Units (PDUs) having been transmitted through an air-interface and acknowledged (ACK) by a correspondence end; the contents in the second type of data packets comprise PDCP PDUs having been transmitted through the air-interface but not being acknowledged by the correspondence end; the contents in the third type of data packets comprise PDCP PDUs not being transmitted through the air-interface; or the contents in the first type of data packets comprise Radio Link Control (RLC) PDUs having been transmitted through the air-interface and acknowledged by the correspondence end; the contents in the second type of data packets comprise RLC PDUs having been transmitted through the air-interface but not being acknowledged by the correspondence end; the contents in the third type of data packets comprise RLC PDUs having not been transmitted through the air-interface;
or the data transmission state information comprises a maximum sequence number corresponding to contents in a first type of data packets, and a maximum sequence number corresponding to contents in a second type of data packets; the maximum sequence number corresponding to contents in the first type of data packets is smaller than or equal to the maximum sequence number corresponding to contents in the second type of data packets;
the determining, according to the data transmission state information, data to be processed, comprises:
determining contents of data packets needing to be re-transmitted and contents of data packets needing to be transmitted in contents of all data packets assigned to the secondary node, according to the maximum sequence number corresponding to the contents in the first type of data packets and the maximum sequence number corresponding to contents in the second type of data packets,
wherein sequence numbers of contents of data packets needing to be re-transmitted are larger than the maximum sequence number corresponding to the contents in the first type of data packets and smaller than the maximum sequence number corresponding to contents in the second type of data packets; the sequence numbers of contents of data packets needing to be transmitted are larger than the maximum sequence number corresponding to the contents in the second type of data packets;
the processing data related to the target link in the alternative link, comprises:
re-transmitting the contents of data packets needing to be re-transmitted in the alternative link, and transmitting the contents of data packets needing to be transmitted in the alternative link;
wherein the contents in the first type of data packets comprise: Packet Data Convergence Protocol (PDCP) Protocol Data Units (PDUs) having been transmitted through an air-interface continuously and acknowledged (ACK) by a correspondence end; the contents in the second type of data packets comprise PDCP PDUs having been transmitted through the air-interface; or
the contents in the first type of data packets comprise: Radio Link Control (RLC) PDUs having been transmitted through the air-interface continuously and acknowledged by the correspondence end; the contents in the second type of data packets comprise RLC PDUs having been transmitted through the air-interface;
or
the data transmission state information comprises a maximum sequence number corresponding to contents in a fifth type of data packets, and sequence numbers of contents in a second type of data packets; the sequence numbers of contents in the second type of data packets are smaller than the maximum sequence number corresponding to the contents in the fifth type of data packets;

the determining, according to the data transmission state information, data to be processed, comprises:

determining contents of data packets needing to be re-transmitted and contents of data packets needing to be transmitted, according to the maximum sequence number corresponding to the contents in the first type of data packets and the sequence numbers of contents in the second type of data packets;

wherein the contents in the second type of data packets are taken as the contents of data packets needing to be re-transmitted; contents of data packets having sequence numbers larger than the maximum sequence number corresponding to the contents in the fifth type of data packets, in contents of all data packets assigned to the secondary node, are taken as the contents of data packets needing to be transmitted;

the transmitting the data related to the target link in the alternative link, comprises: re-transmitting the contents of data packets needing to be re-transmitted in the alternative link, and transmitting the contents of data packets needing to be transmitted in the alternative link;

wherein the contents in the fifth type of data packets comprise Packet Data Convergence Protocol (PDCP) Protocol Data Units (PDUs) having been transmitted through an air-interface, and the contents in the second type of data packets comprise PDCP PDUs having been transmitted through the air-interface but not being acknowledged (ACK) by a correspondence end; or the contents in the fifth type of data packets comprise Radio Link Control (RLC) PDUs having been transmitted through the air-interface; the contents in the second type of data packets comprise RLC PDUs having been transmitted through the air-interface but not being acknowledged by the correspondence end;

or the data transmission state information comprises sequence numbers of contents of data packets having been transmitted through an air-interface and/or sequence numbers of contents of data packets not being transmitted through the air-interface;

the determining, according to the data transmission state information, data to be processed, comprises:

taking, as the data to be processed, the contents of data packets not being transmitted through the air-interface, according to at least one of (i) the sequence numbers of contents of data packets having been transmitted through the air-interface or (ii) the sequence numbers of contents of data packets not being transmitted through the air-interface;

wherein, the contents of data packets having been transmitted through the air-interface comprise Packet Data Convergence Protocol (PDCP) Protocol Data Units (PDUs) having been transmitted through the air-interface; the contents of data packets not being transmitted through the air-interface comprise PDCP PDUs not being transmitted through the air-interface; or the contents of data packets having been transmitted through the air-interface comprise Radio Link Control (RLC) PDUs having been transmitted through the air-interface; the contents of data packets not being transmitted through the air-interface comprise RLC PDUs not being transmitted through the air-interface;

or the data transmission state information comprises a maximum sequence number corresponding to contents of data packets having been transmitted through an air-interface, and the contents of data packets having been transmitted through the air-interface comprise Radio Link Control (RLC) Protocol Data Units (PDUs) having been transmitted through the air-interface;

the determining, according to the data transmission state information, data to be processed, comprises:

taking, as data to be processed, contents of data packets having sequence numbers larger than the maximum sequence number corresponding to contents of data packets having been transmitted through the air-interface, in contents of all data packets assigned to the secondary node.

5. The method according to claim 4, further comprising: receiving link quality recovery indication information transmitted by the secondary node.

6. An information processing device, comprising:

a processor, and a storage, connected to the processor through a bus interface and configured for storing programs and data, wherein, when the processor invokes and executes the programs and the data stored in the storage, the processor implements the method according to claim 1.

7. An information processing device, comprising:

a processor, and a storage, connected to the processor through a bus interface and configured for storing programs and data, wherein, when the processor invokes and executes the programs and the data stored in the storage, the processor implements the method according to claim 4.

8. The information processing device according to claim 6, wherein, the determining whether the link exception exists in the target link or not according to the link state information, comprising:

judging whether the link state information satisfies a pre-determined link deterioration condition or not; and in a case that the link state information satisfies the pre-determined link deterioration condition, determining that the link exception exists in the target link.

9. The information processing device according to claim 6, wherein, after the transmitting the link exception indication information to the primary node, the processor, by invoking and executing the programs and the data stored in the storage, further implements:

under a condition that the link state information of the target link satisfies a predetermined link recovery condition, transmitting link quality recovery indication information to the primary node.

10. The information processing device according to claim 7, wherein, the processor, by invoking and executing the programs and the data stored in the storage, further implements:

receiving link quality recovery indication information transmitted by the secondary node.

* * * * *